US 6,628,631 B1

(12) United States Patent
Mazawa et al.

(10) Patent No.: US 6,628,631 B1
(45) Date of Patent: Sep. 30, 2003

(54) RADIO COMMUNICATION SYSTEM AND HANDOFF METHOD THEREFOR

(75) Inventors: Shiro Mazawa, Yokohama (JP); Kazuhito Ishida, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/261,180

(22) Filed: Mar. 3, 1999

(30) Foreign Application Priority Data

Jan. 27, 1999 (JP) .......................................... 11-018009

(51) Int. Cl.[7] .......................... H04Q 7/20; H04B 7/216
(52) U.S. Cl. ....................... 370/331; 370/342; 455/436; 455/439; 455/442
(58) Field of Search ................................. 370/335, 342, 370/331–333, 465, 480, 468; 455/436–439, 442, 443, 524, 525

(56) References Cited

U.S. PATENT DOCUMENTS

| | | | | |
|---|---|---|---|---|
| 6,018,662 A | * | 1/2000 | Periiyalwar et al. | 455/442 |
| 6,141,555 A | * | 10/2000 | Sato | 455/437 |
| 6,148,209 A | * | 11/2000 | Hamalainen et al. | 455/450 |
| 6,243,582 B1 | * | 6/2001 | Lahtinen | 455/436 |
| 6,249,517 B1 | * | 6/2001 | Roh et al. | 370/342 |
| 6,373,831 B1 | * | 4/2002 | Secord et al. | 370/342 |

* cited by examiner

Primary Examiner—Duc Nguyen
(74) Attorney, Agent, or Firm—Antonelli,Terry,Stout & Kraus, LLP

(57) ABSTRACT

Transmission information inputted to a plurality of radio base stations is encoded and then divided into a plurality of blocks in demultiplexers. Each of the blocks are spread with an orthogonal code, and is subjected to a determination in switches as to whether or not it can be transmitted. Outputs of the switches are again combined, spread with a PN code, and transmitted. A mobile station despreads a received signal with an orthogonal code and a PN code used in the transmission information to extract respective blocks which are multiplexed in a multiplexer, and encoded to extract the transmission information. With the foregoing configuration, a handoff is made in units of blocks.

2 Claims, 20 Drawing Sheets

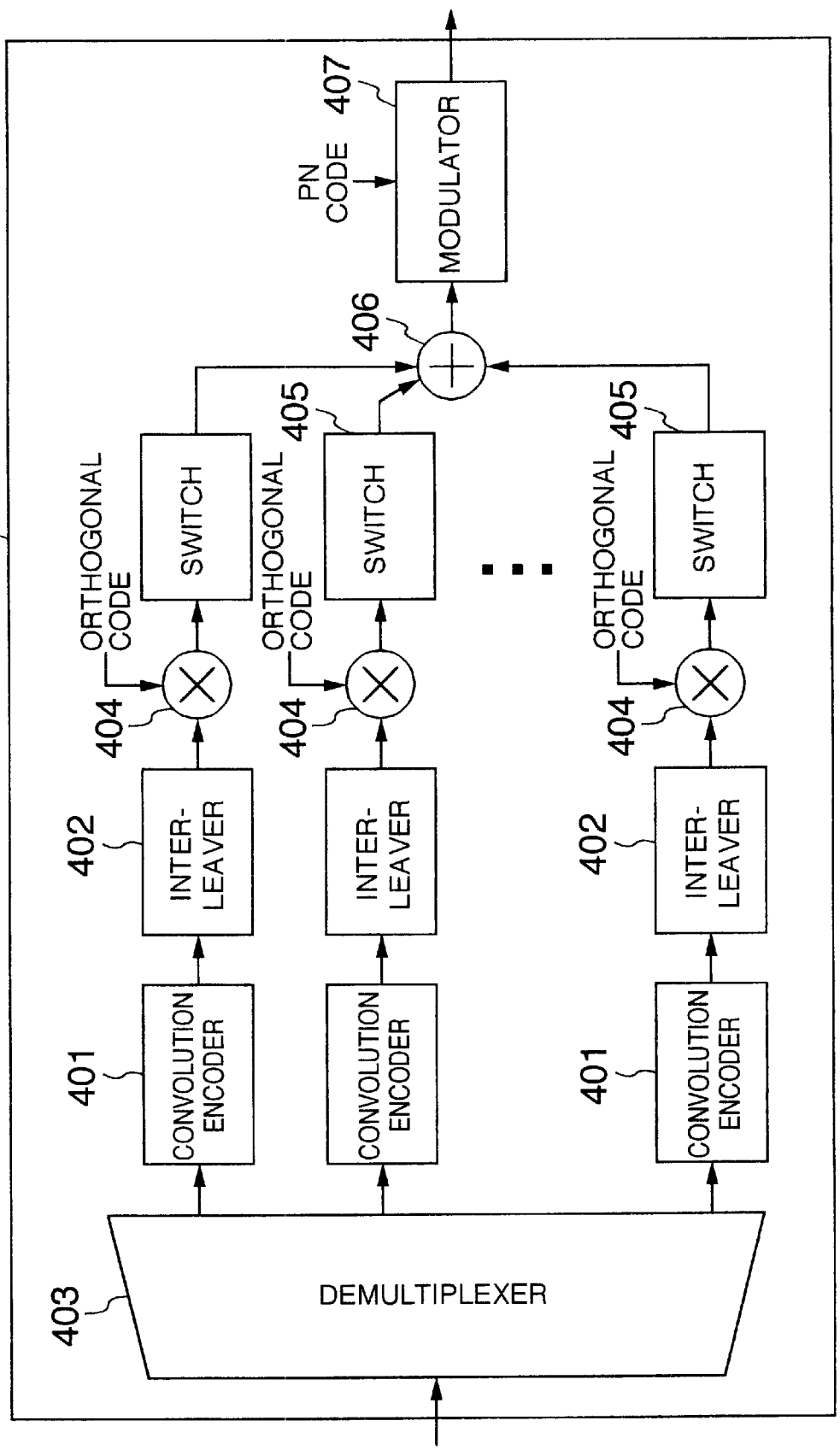

RADIO COMMUNICATION SYSTEM AND HANDOFF METHOD THEREFOR

BACKGROUND OF THE INVENTION

The present invention relates generally to a cellular mobile communication system and a radio communication apparatus, and more particularly to a handoff control method and apparatus in a mobile communication system which enable a mobile station to simultaneously use a plurality of radio channels to communicate with base stations.

In a CDMA (code division multiple access) mobile communication system, a handoff scheme called a "soft handoff" has been brought into practice. The soft handoff is described in U.S. Pat. No. 5,267,261.

The soft handoff is a handoff method which is characterized by uninterrupted communications and a cell diversity effect on the boundary between two cells. The soft handoff is implemented by utilizing a property of the CDMA scheme which permits simultaneous reception of a plurality of radio channels. More specifically, on uplink channels, a signal transmitted by a mobile station is received by a plurality of radio base stations, and the received signal is selected or combined in base station controller associated with the respective radio base stations to realize the above-mentioned property. On downlink channels, on the other hand, a plurality of radio base stations simultaneously transmit signals having the same information, which have been applied with different spreading, to a single mobile station, and the mobile station simultaneously receives the respective signals, despreads them to extract the same information, and then selects or combines the extracted information to realize the above-mentioned property.

However, during a soft handoff, since a plurality of radio base stations are each transmitting to a single mobile station an amount of information identical to that transmitted when no handoff is made, the single mobile station uses a number of downlink channels during a handoff several times larger as compared with that required when no handoff is made. In other words, when the soft handoff is applied, the number of downlink radio channels equal to the number of mobile stations involved in the soft handoff are used at minimum, thereby causing an increase in the amount of co-channel interference of down link channels and a decrease in the capacity of subscribers in the entire system. In addition, the soft handoff might cause each radio base station to run short of radio resources, hereby increasing the possibility of failure in setting new call.

As mentioned above, the conventional soft handoff implies a problem that the system capacity is reduced due to an increased amount of used radio resources in radio base stations and an increased transmission power. In particularly, an asymmetric high-speed circuit data communication, which is expected to experience a rapid increase in demands in near future, uses a large amount of radio resources in the downlink channels and transmission power, so that the high-speed circuit data communication, if the conventional soft handoff is applied thereto, would significantly affect the downlink channels of other users. However, if a hard handoff were applied to the channel switching high-speed data communication, this would introduce a problem of a large amount of dropped data due to interrupted communications.

SUMMARY OF THE INVENTION

The present invention has been made in view of the problem mentioned above, and its object is to provide handoff means which maintains a consistent amount of used radio resources in a radio base station regardless of whether a handoff is being made or not, while preserving the advantages of the conventional soft handoff, i.e., uninterrupted communications and cell diversity effect.

To achieve the above object, the present invention provides a handoff method, wherein a radio base station comprises means for performing error correction encoding and interleaving on transmission information, dividing the processed transmission information into a plurality of blocks, and transmitting each of the blocks through a plurality of downlink radio channels, a mobile station comprises means for simultaneously receiving the plurality of downlink radio channels transmitted from the plurality of radio base stations to the mobile station, and means for demodulating each of received signals and rearranging and decoding the demodulated signals to extract original information, wherein as the mobile station hands off from a first radio base station currently connected thereto to a second radio base station, a plurality of downlink radio channels are handed off in order at least on a one-by-one basis, and while the plurality of downlink radio channels are being handed off at least on a one-by-one basis, the remaining downlink radio channels continue communications.

In another aspect, the present invention provides a radio communication system having a mobile station and a plurality of radio base stations, wherein each of the radio base stations comprises an encoder for encoding transmission information directed to the mobile station, a divider for dividing the encoded transmission information into a plurality of partial channels, and a transmitter for transmitting the partial channels, the mobile station comprises a receiver for receiving the plurality of partial channels, a combiner for combining the plurality of received partial channels, and decoder for decoding the combined transmission information, and the mobile station hands off the plurality of partial channels at least on a one-by-one basis, when handing off from a first radio base station to a second radio base station.

In the radio base station, the encoder preferably encodes transmission information using a convolutional code.

When the plurality of partial channels are handed off to the second radio base station, the mobile station may continuously communicate a radio channel, which has not been handed off, through the first radio base station.

The radio base station preferably includes a switch for setting whether or not transmission is possible for each of the plurality of partial channels.

In a further aspect, the present invention provides a radio communication system having a mobile station and a plurality of radio base stations, wherein each of the radio base stations comprises an encoder for encoding transmission information directed to the mobile station, a divider for dividing the encoded transmission information into a plurality of partial channels, an orthogonal encoder for orthogonally encoding the plurality of partial channels respectively with orthogonal codes which are orthogonal to each other, a spreader for spreading the orthogonally encoded partial channels with the same spread code, and a transmitter for transmitting the spread partial channels, the mobile station comprises a receiver for receiving the plurality of partial channels, a despreader for despreading the plurality of received partial channels, a combiner for combining the despread partial channels, and decoder for decoding the combined transmission information, and the mobile station hands off the plurality of partial channels at least on a one-by-one basis, when handing off from a first radio base station to a second radio base station.

Also, when the plurality of partial channels are handed off to the second radio base station, the mobile station may continuously communicate a radio channel, which has not been handed off, through the first radio base station.

The radio base station preferably includes selecting means for setting whether or not transmission is possible for each of the plurality of partial channels. The selecting means may be a hardware switch or a software switch.

Further, in a radio communication system having a mobile station and a plurality of radio base stations, the radio base stations each comprises an encoder for convolutional encoding transmission information directed to the mobile station, a divider for dividing the convolutional encoded transmission information into a plurality of partial channels, and a transmitter for transmitting the partial channels, wherein the radio base station hands off the plurality of partial channels at least on a one-by-one basis when the mobile station in communication with the radio base station initiates a handoff.

Further, in a radio communication system having a mobile station and a plurality of radio base stations, the radio base stations each comprises an encoder for encoding transmission information directed to the mobile station, a divider for dividing the encoded transmission information into a plurality of partial channels, an orthogonal encoder for orthogonally encoding the plurality of partial channels respectively with orthogonal codes which are orthogonal to each other, a spreader for spreading the orthogonally encoded partial channels with the same spread code, and a transmitter for transmitting the spread partial channels, wherein the radio base station hands off the plurality of partial channels at least on a one-by-one basis when the mobile station in communication with the radio base station initiates a handoff.

Further, in a radio communication system having a mobile station and a plurality of radio base stations, the mobile station comprises a receiver for receiving a plurality of partial channels transmitted by the radio base stations, a combiner for combining the plurality of received partial channels, and a decoder for decoding the combined transmission information, wherein the mobile station hands off the plurality of partial channels at least on a one-by-one basis when handing off with the plurality of radio base stations.

Further, in a radio communication system having a mobile station and a plurality of radio base stations, the mobile station comprises a receiver for receiving a plurality of partial channels transmitted by the radio base stations, a despreader for despreading the plurality of received partial channels, a combiner for combining the despread partial channels, and a decoder for decoding the combined transmission information, wherein the mobile station hands off the plurality of partial channels at least on a one-by-one basis when handing off with the plurality of radio base stations.

In a further aspect, the present invention provides a radio communication apparatus for communicating with a plurality of base stations using a CDMA scheme, which comprises a signal search element for detecting spread code offsets of respective signals transmitted by the plurality of base stations, demodulation elements each for despreading one of the signals using an associated spread code having an offset detected by the signal search element to demodulate the one signal, a first symbol combiner for RAKE combining signals transmitted from the same base station within the despread and demodulated signals, orthogonal code correlators each for despreading a signal RAKE combined by the first symbol combiner with an appropriate orthogonal code to extract a plurality of blocks, a second symbol combiner for RAKE combining each of the blocks extracted from the orthogonal code correlators, a multiplexer circuit for multiplexing outputs of the symbol combiner, and a reception system for rearranging and decoding an output of the multiplexer circuit to extract original information.

In a further aspect, the present invention provides a handoff method for a radio communication system comprising a mobile station, a plurality of radio base stations, and a controller for controlling a handoff of the mobile station between the radio base stations, wherein the controller transmits a first partial channel transmission start instruction signal for transmitting a first partial channel to a handoff destined radio base station within the plurality of radio base stations, and the handoff destined radio base station transmits the first partial channel based on the first partial channel transmission start instruction signal, the controller transmits a first partial channel transmission stop instruction signal for stopping the transmission of the first partial channel to a handoff initiated radio base station when the mobile station has connected the first partial channel to the handoff destined radio base station, the handoff initiated radio base station, upon receipt of the first partial channel transmission stop instruction signal, stops transmitting the first partial channel, the controller, upon starting/completing a handoff of the first partial channel, transmits a second partial channel transmission start instruction signal to the handoff destined radio base station within the plurality of radio base stations, and the handoff destined radio base station transmits the second partial channel based on the second partial channel transmission start instruction signal, the controller transmits a second partial channel transmission stop instruction signal for stop transmitting the second partial channel, which has been connected, to the handoff initiated radio base station when the mobile station has connected the second partial channel to the handoff initiated radio base station, and the handoff initiated radio base station, upon receipt of the second partial channel transmission stop instruction signal, stops transmitting the second partial channel.

In a further aspect, the present invention provides a handoff method for a radio communication system comprising a mobile station, a plurality of radio base stations, and a controller for controlling a handoff of the mobile station between the radio base stations, wherein the controller transmits a first partial channel transmission start instruction signal for transmitting a first partial channel to a handoff destined radio base station within the plurality of radio base stations, and the handoff destined radio base station, based on the first partial channel transmission start instruction signal, encodes transmission information directed to the mobile station, divides the encoded transmission information into a plurality of partial channels, orthogonally encodes the plurality of partial channels respectively with orthogonal codes which are orthogonal to each other, spreads the orthogonally encoded partial channels with a spread code, and transmits a first partial channel within the spread partial channels, the controller transmits a first partial channel transmission stop instruction signal for stopping the transmission of the first partial channel, which has been connected, to a handoff initiated radio base station when the mobile station has connected the first partial channel to the handoff destined radio base station, the handoff initiated radio base station, upon receipt of the first partial channel transmission stop instruction signal, stops transmitting the first partial channel, the controller transmits a second partial channel transmission start instruction signal to the handoff destined radio base station within the plurality of radio base stations, the handoff destined radio base station, based on the second partial channel transmission start instruction signal, encodes transmission information directed to the mobile station, divides the encoded transmission information into a plurality of partial channels, orthogonally encodes the plurality of partial channels respectively with orthogonal codes, which are orthogonal to each other, spreads the orthogonally encoded partial channels with a spread code, and transmits a second partial channel within the spread partial channels, the controller transmits a second partial channel transmission stop instruction signal for stop transmitting the second partial channel, which has been connected, to the handoff initiated radio base station when the mobile station has connected the second partial channel to the handoff destined radio base station, and the handoff initiated radio base station, upon receipt of the transmission stop instruction signal, stops transmitting the second partial channel.

In a further aspect, the present invention provides a handoff method for a radio communication system comprising a mobile station, a plurality of radio base stations, and a controller for controlling a handoff of the mobile station between the radio base stations, wherein a first radio base station within the radio base stations divides information to be transmitted to the mobile station into a plurality of blocks, selects a block to be transmitted to the mobile station within the plurality of blocks based on an instruction signal from the controller, orthogonally encodes the selected block, spreads the orthogonally encoded block with a spread code, and transmits the spread block to the mobile station, a second radio base station within the radio base stations divides information to be transmitted to the mobile station into a plurality of blocks, selects a block to be transmitted to the mobile station within the plurality of blocks based on an instruction signal from the controller, orthogonally encodes the selected block, spreads the orthogonally encoded block with a spread code, and transmits the spread block to the mobile station, and the mobile station receives blocks transmitted from the first and second radio base stations, and diversity combines the orthogonally encoded blocks with the same orthogonal code.

As described above, the present invention can realize a handoff without causing a change in the amount of used radio resources available to a radio base station when a channel is switched, and without suffering from disruption. It is therefore possible to save radio resources and transmission power of the radio base station as well as to increase the capacity of subscribers for the entire system, as compared with a conventional soft handoff. This effect is significant particularly when the present invention is applied to high speed data communications which use a large amount of radio resources and a high transmission power. In addition, the present invention can be readily applied to a conventional CDMA radio communication system.

BRIEF DESCRIPTION OF THE DRAWINGS

FIG. 22 is a block diagram illustrating channel elements in a transmission system of another radio base station according to the present invention.

DETAILED DESCRIPTION OF THE PREFERRED EMBODIMENTS

1. Basic Configuration of Radio Communication System

Figure 2:
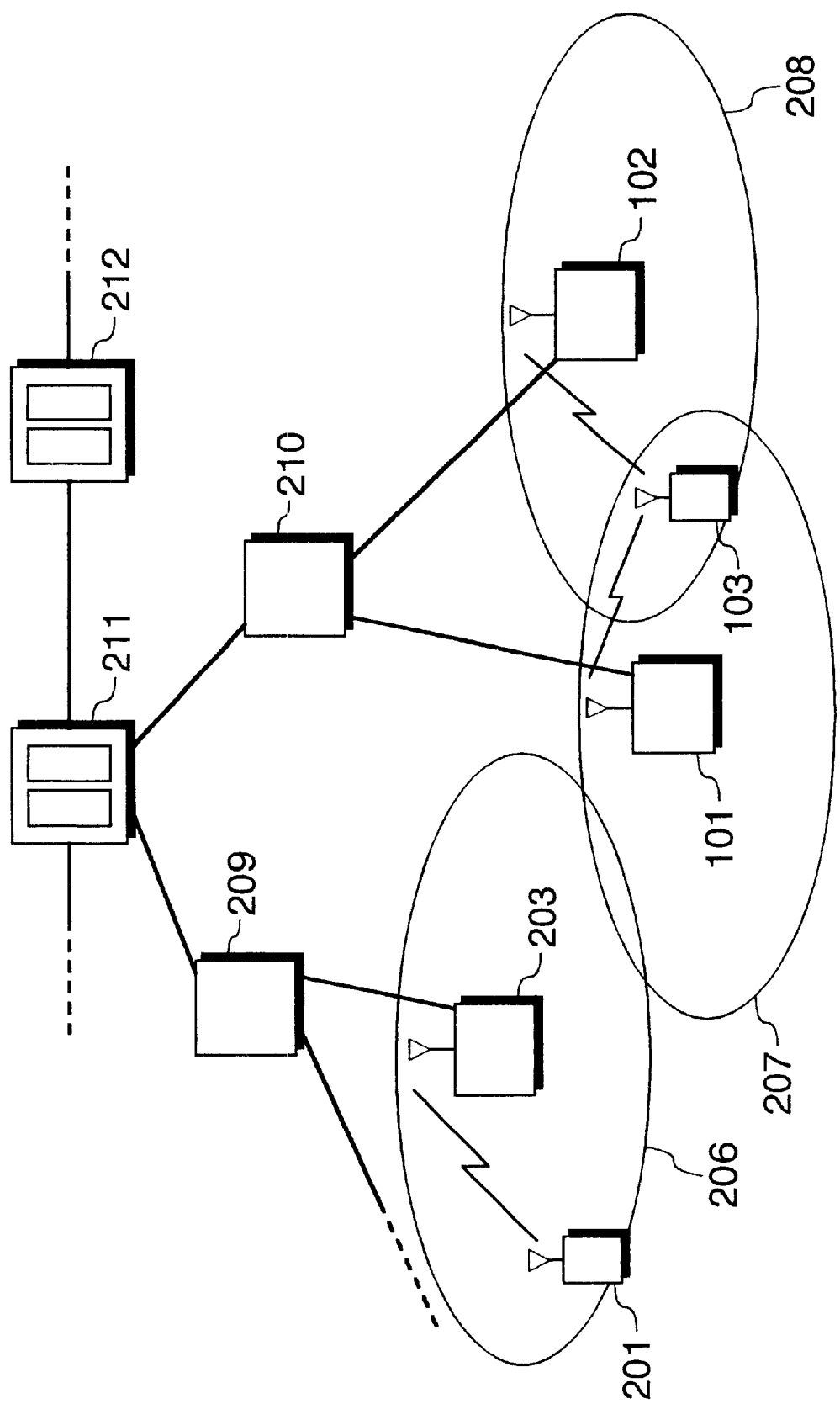
FIG. 2 is a schematic diagram generally illustrating a CDMA system according to the present invention.

FIG. 2 illustrates the configuration of a radio communication system according to the present invention. This figure illustrates the configuration of a CDMA cellular mobile communication system as an example.

A radio base station 203 having a service area 206 is communicating with a mobile station 201 located in the service area 206 through a radio channel. Also, a radio base station 101 having a service area 207 and a radio base station 102 having a service area 208 are simultaneously communicating with a mobile station 103 located in an overlapped portion of the two service areas. The radio base station 203 is connected to a base station controller 209 through a wired or radio communication channel, while the radio base stations 101, 102 are connected to a base station controller 210 likewise through a wired or radio communication channel.

The base station controllers 209, 210 are connected to a switching center 211 through communication channels. Each of the base station controllers controls a plurality of radio base stations connected thereto to direct termination of radio interface, handoff, and so on.

The switching center 211 is connected to another switching center 212 and a public switched telephone network (PSTN) to route a call to an appropriate channel.

2. Outline of Hardware

Figure 1:
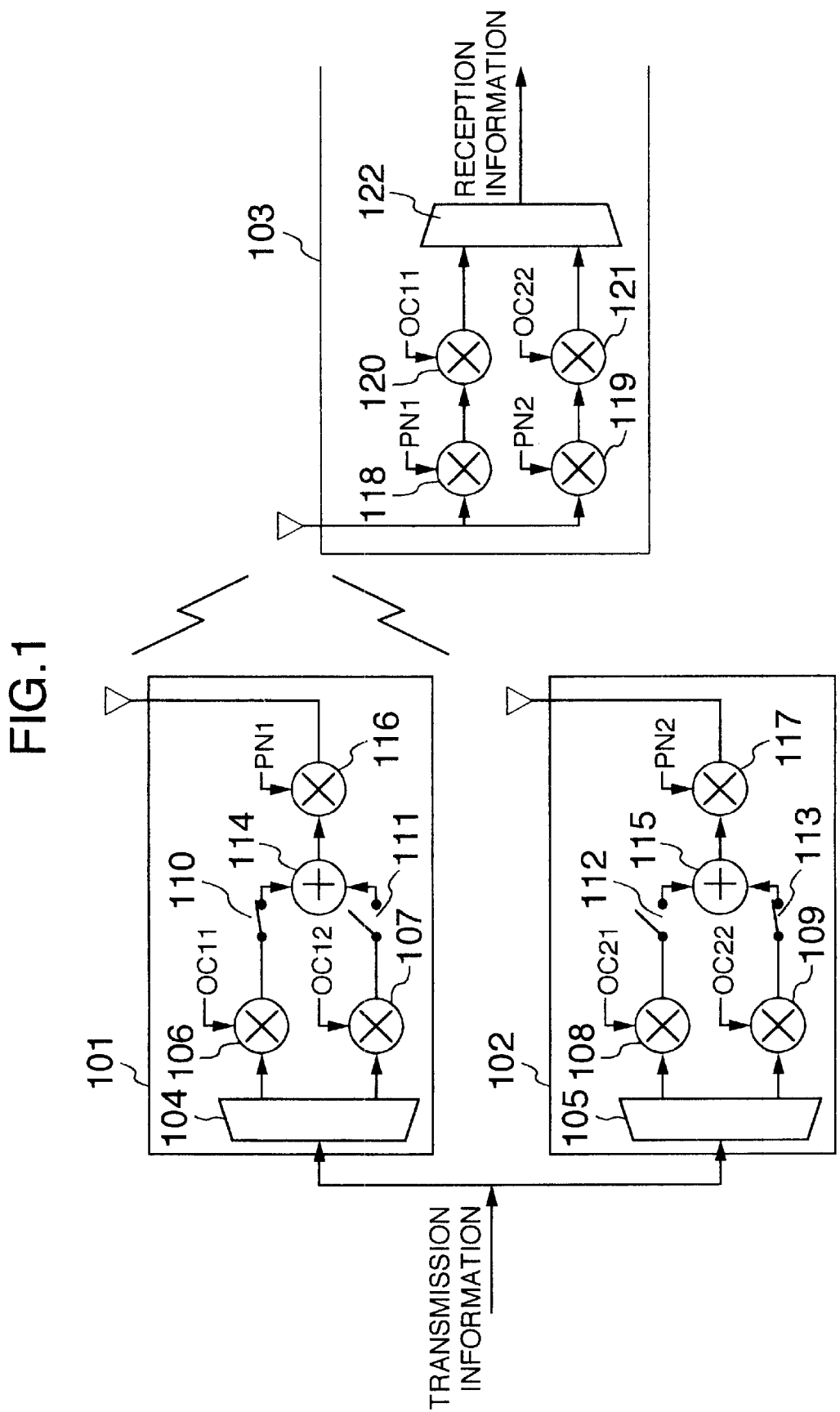
FIG. 1 is a schematic diagram illustrating a radio base station and mobile stations according to the present invention.

FIG. 1 is a schematic diagram illustrating radio base stations and a mobile station according to one embodiment of the present invention. This embodiment shows a state in which the mobile station 103 is attempting a handoff between the radio base stations 101, 102, and is simultaneously receiving transmissions from the two radio base stations.

Transmission information inputted to the mobile station 103 from the network side is identically inputted to the radio base stations 101, 102 through a base station controller. In the radio base stations 101, 102, the transmission information is encoded and interleaved, and then divided into two in demultiplexers 104, 105, respectively. Outputs of the demultiplexers 104, 105 are hereinafter designated "partial channel 1" and "partial channel 2" from the above. The partial channels are spread in spreaders 106–109 with orthogonal codes OC11, OC12, OC21, OC22, and thereafter, it is determined in switches 110–113 whether or not the respective partial channels can be transmitted. In FIG. 1, the partial channel 1 is outputted, while the partial channel 2 is not outputted in the radio base station 101. In the radio base station 102, in turn, the partial channel 1 is not outputted, while the partial channel 2 is outputted. Outputs of the switches 110–113 are combined by adders 114, 115, respectively, spread in spreaders 116, 117 with PN codes, and transmitted from antennas. The orthogonal codes are used to place the respective channels transmitted from the same radio base station in an orthogonal relationship, while the PN (pseudo noise) codes are used to identify radio base stations associated with the respective channels. It should be noted that while the switch illustrated in FIG. 1 is positioned between the orthogonal encoder and the adder, the switch may be positioned before the orthogonal encoder. Further alternatively, the switch may be positioned even in the demultiplexer. In any case, the switch is not at all limited by its position or configuration as long as it has a function of selecting a partial channel to be transmitted. For example, the switch may be implemented by a hardware switch or a software switch.

Upon receipt of signals, the mobile station 103 despreads the signals in correlators 118, 119 with PN codes corresponding to the radio base stations 101, 102, respectively, to extract signals from the respective radio base stations. Next, the mobile station 103 despreads the signals in correlators 120, 121 with corresponding orthogonal codes to extract both partial channels. In FIG. 1, the partial channel 1 transmitted from the radio base station 101 is extracted by correlating the same with OC11, while the partial channel 2 transmitted from the radio base station 102 is extracted by correlating the same with OC22. Next, the mobile station 103 rearranges both of the partial channels in the original order in a multiplexer 122, and deinterleaves and decodes the rearranged partial channels to extract original transmission information.

As described above, FIG. 1 illustrates that one of the partial channels is transmitted from one of the radio base stations, while the other partial channel is transmitted from the other radio base station. Based on the control from the base station controller, the respective base stations switch the switches 110–113, and the mobile station 103 responsively switches PN codes and orthogonal codes to corresponding ones in the correlators 118–121, thereby making it possible to correctly restore transmission information whether a particular partial channel has been transmitted from either of the two radio base stations. In other words, a handoff can be executed in units of partial channels.

By making a handoff in units of partial channels, the cell diversity effect is provided, and the amount of used radio resources on the downlink channel during a handoff is made equivalent to that required when no handoff is made. In FIG. 1, the two partial channels, one of which has been received from the radio base station 101, and the other of which has been received from the radio base station 102, are multiplexed and deinterleaved to produce a sequence which is inputted to the decoder. Since the reception power of this sequence is considered to be an average of reception powers from both the radio base stations, a frame error probability of a signal decoded from this sequence is lower as compared with that of a signal which is received exclusively from a radio base station placed in a worse radio situation. In other words, the cell diversity effect exists. This effect is increased as a code having a higher error correcting capability is used, or a division unit in the demultiplexers 104, 105 s smaller with respect to an interleave unit and an encoding unit. The amount of used radio resources on the downlink channels is equivalent to that used when both partial channels are transmitted from a single radio base station.

3. Details on Hardware 3.1 Transmission System in Radio Base Station

Figure 3:
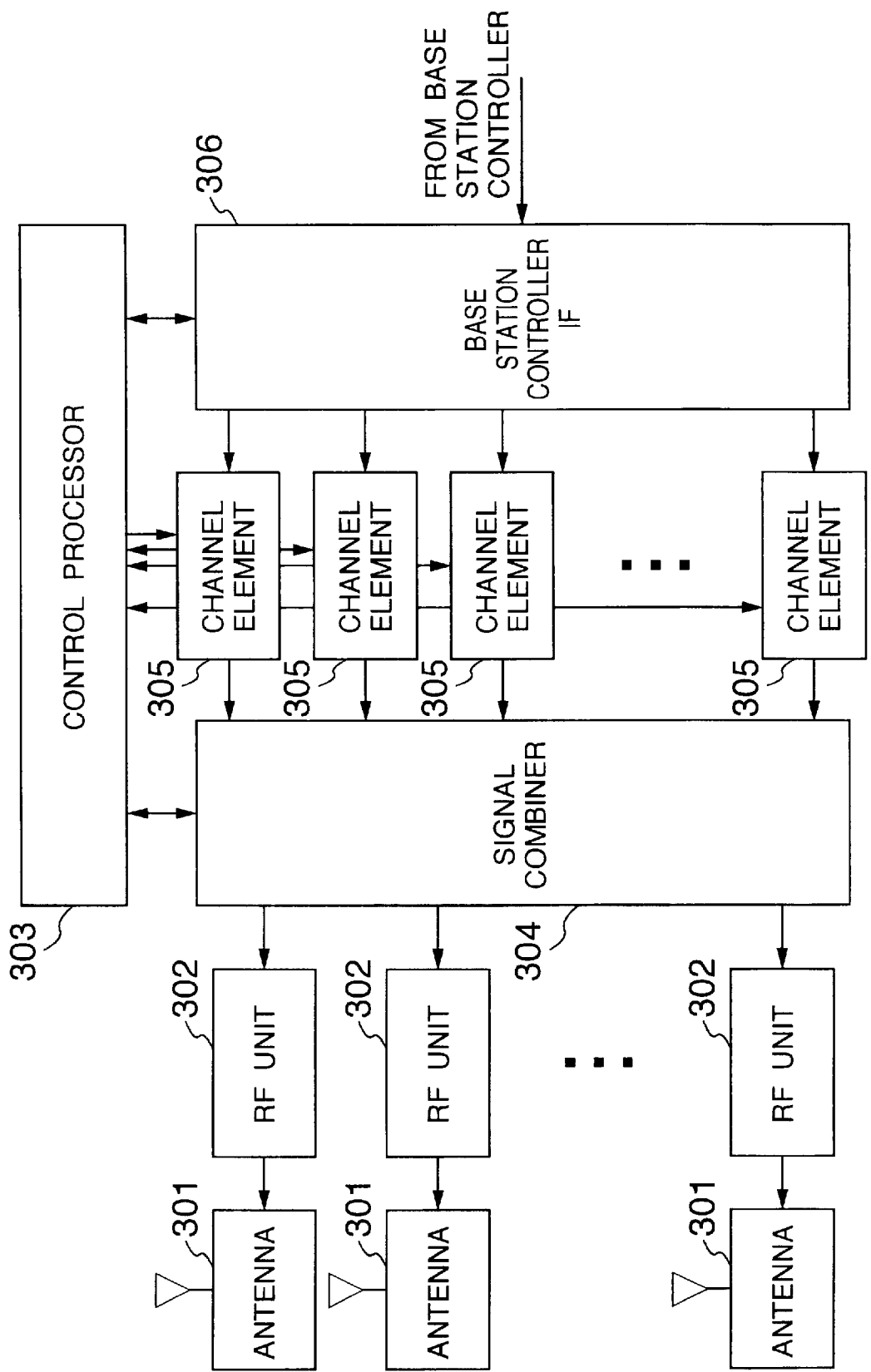
FIG. 3 is a block diagram illustrating a transmission system in the radio base station according to the present invention.

FIG. 3 illustrates in a block diagram form an embodiment of a transmission system in the radio base station. A base station controller interface 306 has a function of routing a signal supplied from a base station controller to an appropriate channel element 305 in accordance with instructions from a control processor 303. The channel element 305 is a circuit which corresponds one by one to a mobile station currently under communication, and has a function of encoding and modulating a signal supplied from the base station controller. Detailed functions provided by the channel element 305 will be described later with reference to FIG. 4. A signal combiner 304 has functions of combining output signals of respective channel elements 305 after they have been routed for each sector, and supplying the combined signal to an RF unit 302 corresponding to each sector. A signal inputted to the RF unit 302 is digital-to-analog (D/A) converted, filtered, frequency converted to an RF frequency band, and amplified, and eventually transmitted from an antenna 301.

Figure 4:
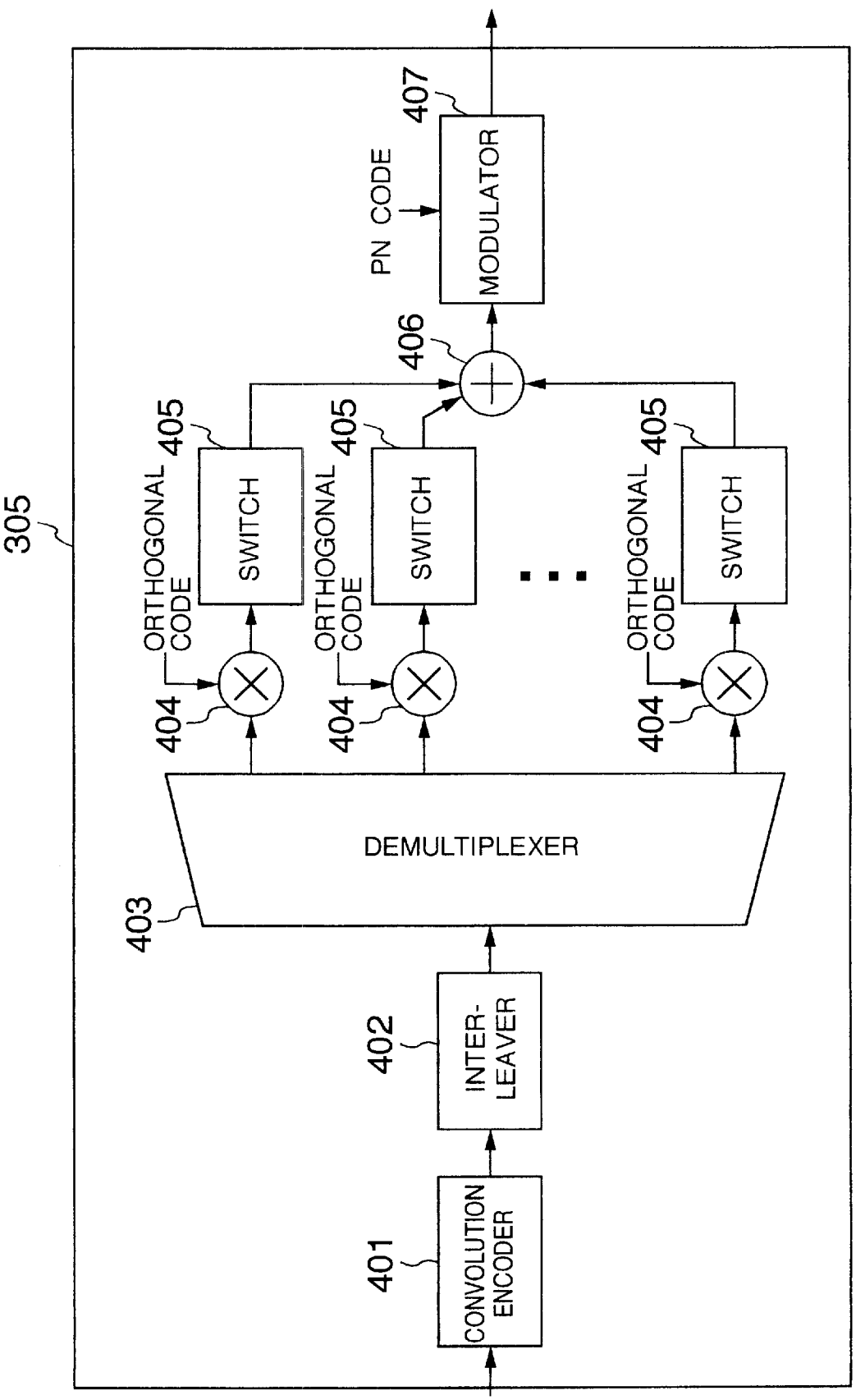
FIG. 4 is a block diagram illustrating a channel element in the transmission system of the radio base station according to the present invention.

Next, FIG. 4 illustrates in a block diagram form an embodiment of the channel element 305 in the transmission system of the radio base station. A convolution encoder 401 has a function of encoding a signal inputted from the base station controller interface 306. An interleaver 402 has a function of rearranging a signal in a predefined order and outputting the rearranged signal. In this way, a time diversity effect is provided to a transmission signal. A demultiplexer 403 has a function of distributing a signal inputted thereto on a bit-by-bit basis orderly from the above, and separately outputting the distributed bits. Respective outputs of the demultiplexer 403 are hereinafter called "partial channels 1, 2, . . . ," from the above. In this embodiment, the handoff is controlled in units of partial channels.

As an example of the operation of the demultiplexer 303, consider that a signal is divided into four partial channels. While a variety of 20 techniques may be contemplated for the division, if a signal is equally divided into respective channels, the first bit, fifth bit, ninth bit, thirteenth bit, . . . , of an inputted code are outputted to a partial channel 1; the second bit, sixth bit, tenth bit, fourteenth bit, . . . , to a partial channel 2; the third bit, seventh bit, eleventh bit, fifteenth bit, . . . , to a partial channel 3; and the fourth bit, eighth bit, twelfth bit, sixteenth bit, . . . , to a partial channel 4. In this event, the bit rate of each partial channel is one quarter of the bit rate before the division. Instead of dividing bit by bit, the signal may be divided in units of a plurality of bits. Further, it is contemplated that as another alternative method, the signal may be unequally divided. In this case, the signal may be divided in proportion to the states of transmission paths. More specifically, a larger amount of information is assigned to a partial channel with less errors, while a smaller amount of information is assigned to a partial channel with more errors. For example, a signal may be divided such that the partial channel 1 is assigned seven bits; the partial channel 2, five bits; the partial channel 3, three bits, and the partial channel 4, one bit. When a signal is divided in this way, less erroneous communications can be achieved.

Next, the respective partial channels are spread in associated spreaders 404 with orthogonal codes. This spreading places each partial channel in an orthogonal relationship with the remaining partial channels and all channels transmitted in the same sector, so that each partial channel can be extracted by correlating the channel with the same orthogonal code in a despreader 504 of a mobile station.

The respective partial channels spread in the spreaders 404 are inputted to associated switches 405. Each of the switches 405 turns on and off the transmission of a partial channel associated therewith. The switches 405 are instructed to turn on and off by the base station controller. When the switch 405 is on, the switch 405 outputs an inputted partial channel as it is without adding any modification thereto. When the switch 405 is off, the switch 405 outputs all 0's.

The outputs of the switches 405 are combined in an adder 46, and then spread in a modulator 407 with a PN code. As mentioned above, the PN code is used to identify an associated radio base station. A PN code offset is different from a radio base station to another, so that it is used to identify each radio base station. It should be noted that pilot signal offsets of all radio base stations are sufficiently spaced from offsets of other radio base stations located nearby so as to prevent an arbitrary mobile station from mixing a pilot signal of a certain radio base station with a multipath component of a pilot signal of another radio base station. Thus, a mobile terminal can extract signals from respective radio base stations by correlating the signals with PN codes having correctly adjusted offsets in the despreader 54 of the mobile station. An output signal of the modulator 407 is transmitted to the signal combiner 304.

The channel element 305 may have another configuration. For example, the channel element may be configured as illustrated in FIG. 22, although this configuration is more complicated as compared with the channel element 305 of FIG. 4. Further, the channel element may be formed of a demultiplexer, an interleaver and a convolution encoder arranged in this order or formed of an interleaver, a demultiplexer and a convolution encoder arranged in this order. In other words, the channel element may be configured by rearranging these three components in any way as required. It should be noted however that a mobile station must have a multiplexer, a convolution decoder and a deinterleaver arranged in conformity to the configuration of an associated radio base station, i.e., in the same order as their counterparts in the radio base station.

3.2 Reception System in Mobile station

Figure 5:
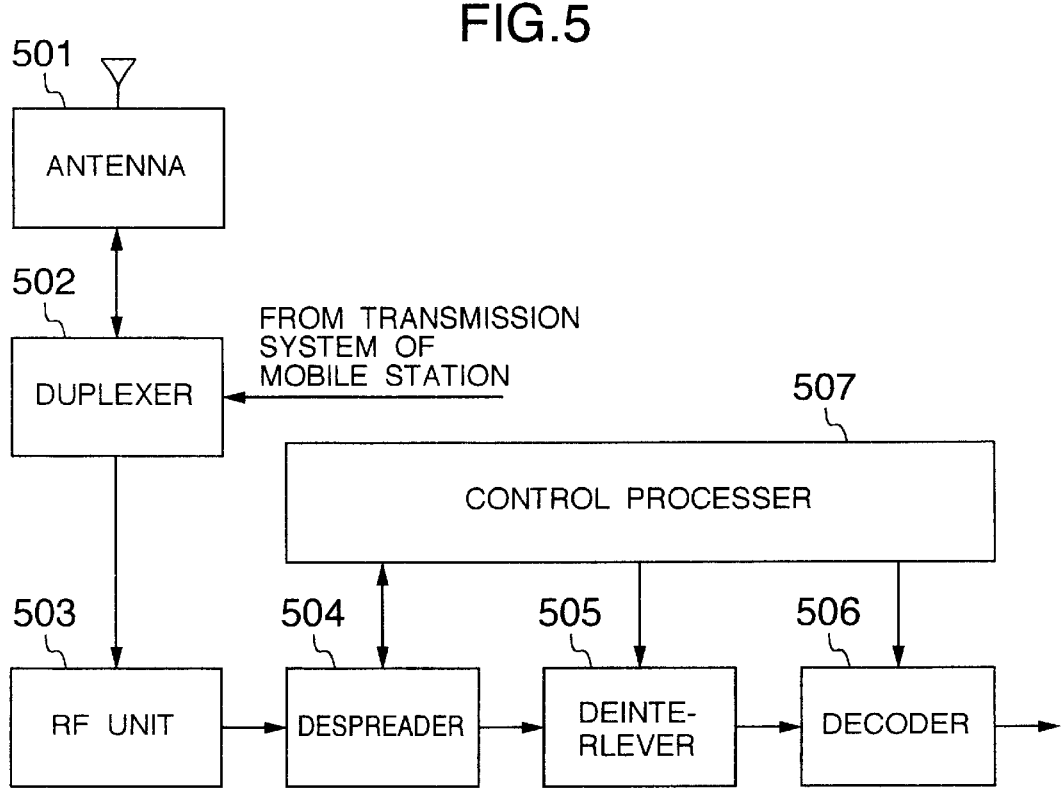
FIG. 5 is a block diagram illustrating a reception system of the mobile station according to the present invention.

FIG. 5 illustrates in a block diagram form an embodiment of a reception system in the mobile station. An antenna 501, which can be used for both transmission and reception, supplies a transmission signal from a radio base station to an RF unit 503 through a duplexer 502, and simultaneously transmits a signal supplied from a transmission system of the mobile station. The duplexer 502 uses the antenna 501 for both transmission and reception. The RF unit 503 applies a reception signal with amplification, frequency conversion to an IF frequency, filtering in an IF frequency band, and analog-to-digital (A/D) conversion in order. An output of the RF unit 503 is supplied to a despreader 504. The despreader 504 has a function of correlating a reception signal with a PN code and an orthogonal code for combination after adjusting the timing for the reception signal. Detailed functions of the despreader 504 will be described later with reference to FIG. 6. An output of the despreader 504 is inputted to a deinterleaver 505. The deinterleaver 505, which corresponds to the interleaver 402 in the channel element 305 of the radio base station, restores the original order of a signal which has been rearranged by the interleaver 402. A decoder 506, which corresponds to the convolution encoder 401, extracts original transmission information by decoding. A control processor 507 generally controls the processing mentioned above.

Figure 6:
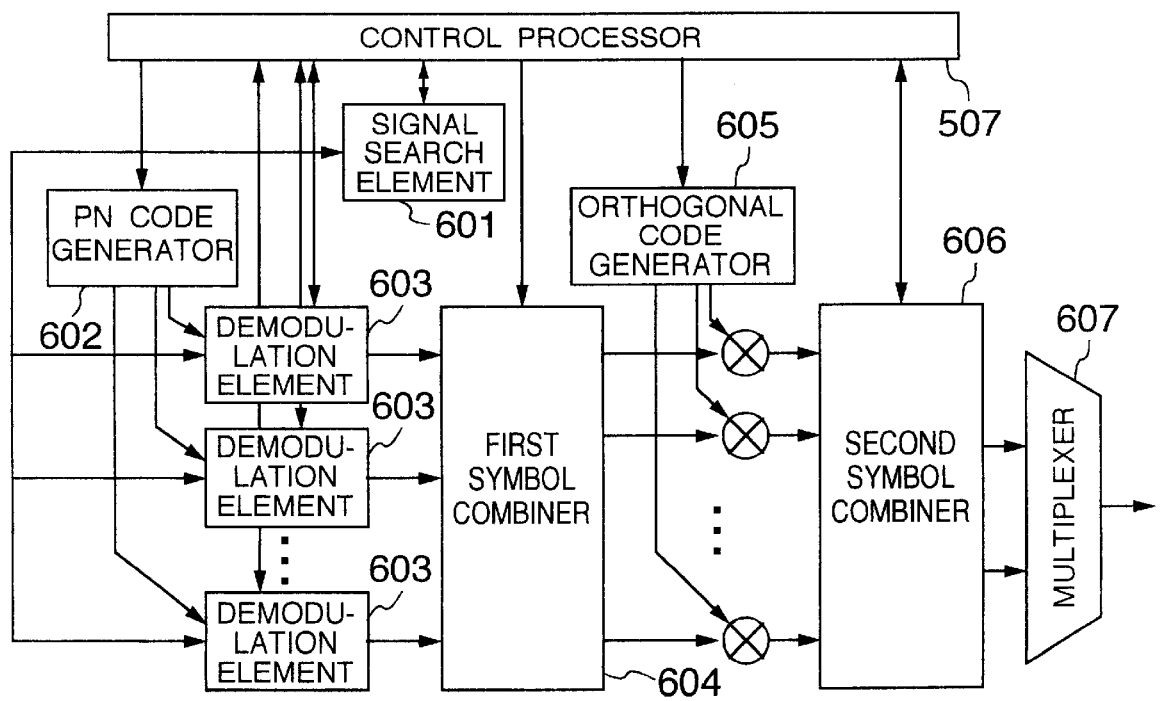
FIG. 6 is a block diagram illustrating a despread circuit in the reception system of the mobile station according to the present invention.

Next, FIG. 6 illustrates in a block diagram form an embodiment of the despreader 504 in the reception system of the mobile station. A signal inputted from the RF unit 503 is supplied to a signal search element 601 and to a plurality of demodulation elements 603. When the mobile station is not currently in communication with a radio base station, a digital signal supplied from the RF unit 503 includes a pilot signal of a radio base station to which the mobile station currently belongs, pilot signals of radio base stations in neighboring cells, and their multipath components. When the mobile station is in communication with a radio base station, a digital signal supplied from the RF unit includes a transmission signal from the radio base station together with these pilot signals. The received strengths of these signals can be measured by correlating them with PN codes having appropriate offsets, respectively. The signal search element 601 replaces in order offsets of the PN codes with which the signals are correlated to compute correlated values of a plurality of PN codes with the input signals, thus computing correlated values of all PN code offsets with input signals, both of which can be received by the mobile station. This is called a "search for offsets." The signal search element 601 sequentially repeats the search to transmit an offset with a high correlated value to the control processor 507. In this way, the control processor 507 can be aware of receivable pilot signals, and offsets of transmission signals transmitted in synchronism therewith. The control processor 507 has been previously notified from neighboring radio base stations of offsets used thereby, and compares offsets applied from the signal search element 601 with the previously notified offsets to find currently available radio base stations for reception and to calculate propagation delay amounts associated therewith.

The control processor 507 assigns an offset of a radio base station, which is to be received, to a PN code generator 602. The PN code generator 602, in accordance with a command signal from the control processor 507, generates PN codes having appropriate offsets and supplies respective demodulation elements 603 with the generated PN codes. The control processor 507 also supplies the respective demodulation elements 603 with the calculated propagation delay amounts. The respective demodulation elements 603 adjusts the timing based on the propagation delay amounts supplied thereto to successively correlate supplied offsets of PN codes with input signals to detect transmission signals from radio base stations.

A first symbol combiner 604, in accordance with a command signal from the control processor 507, performs a maximum ratio combination or a selective combination for all signals transmitted from the same radio base station within respective signals supplied from the respective demodulation elements 603. With this processing, a path diversity effect is provided, resulting in an improved reception accuracy. This processing is generally called "RAKE combination." Also, the control processor 507 always recognizes the number of partial channels transmitted from each radio base station to this mobile station, and orthogonal codes corresponding to the respective partial channels by control signals transmitted thereto from the respective radio base stations. The first symbol combiner 604, in accordance with an instruction from the control processor 507, outputs signals each grouped for each of radio base stations to appropriate correlators. If a signal from a radio base station includes a plurality of partial channels, the first symbol combiner 604 outputs the signal to a number of correlators equal to the number of included partial channels. In this way, the first symbol combiner 604 has a function of improving the accuracy of signals supplied from the respective demodulation elements 603 by grouping the signals for each of radio base stations, and outputting the signals to appropriate correlators.

An orthogonal code generator 605, in accordance with an instruction from the control processor 507, generates an appropriate orthogonal code at appropriate timing. By correlating the output of the first symbol combiner 604 with an orthogonal code in a correlator, each partial channel can be extracted with noise added thereto.

A second symbol combiner 606, in accordance with an instruction from the control processor 507, performs a maximum ratio combination or a selective combination of signals supplied from correlators for each of partial channels. By combining partial channels supplied simultaneously from a plurality of radio base stations, a cell diversity effect is provided in a manner similar to the conventional soft handoff.

The second symbol combiner 606 outputs each of extracted partial channels to a multiplexer 607. The multiplexer 607, which corresponds to the demultiplexer 403, can extract information before division with noise added thereto by appropriate multiplexing.

3.3 Base Station Controller

Figure 7:
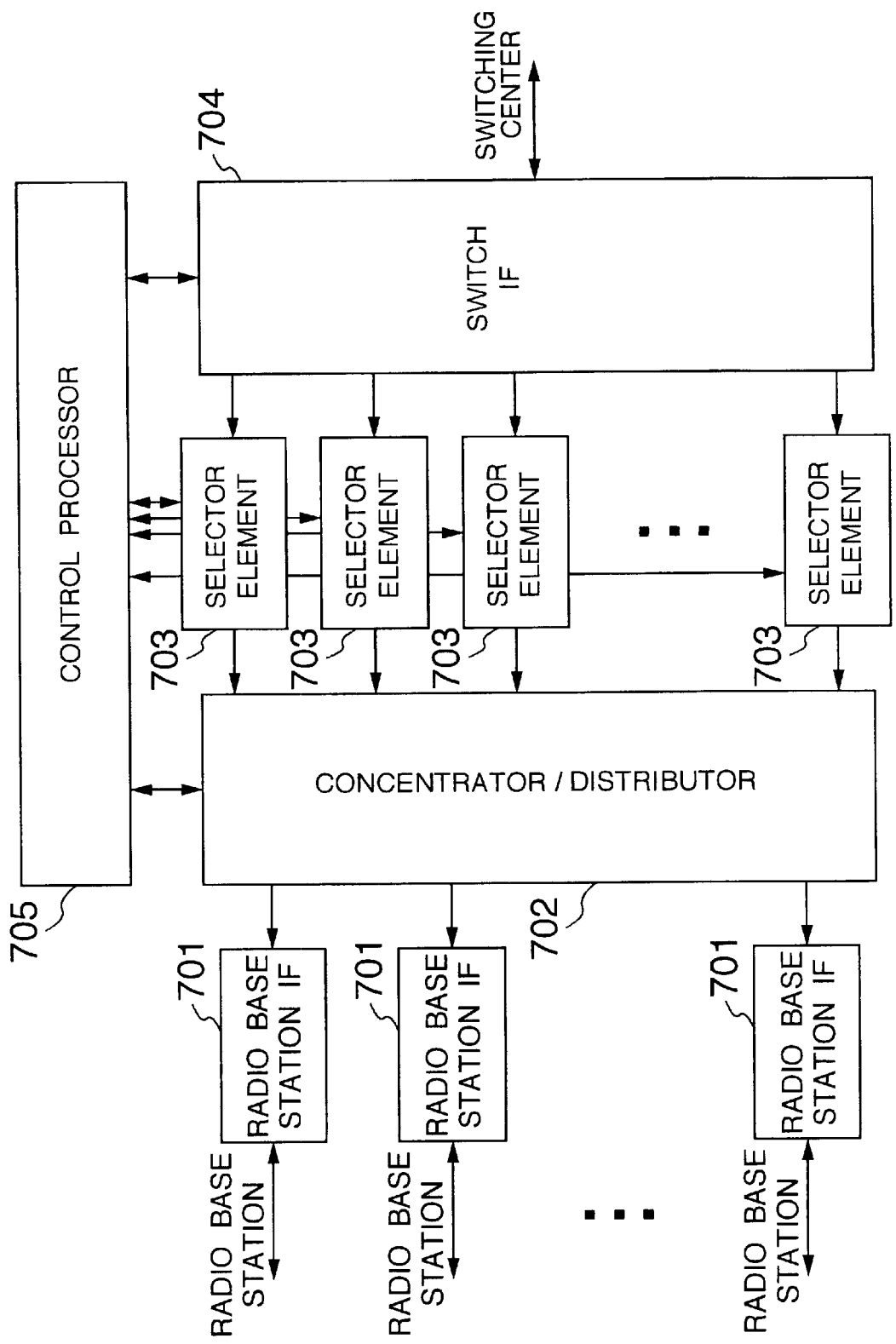
FIG. 7 is a block diagram illustrating a base station controller according to the present invention.

FIG. 7 illustrates in a block diagram form an embodiment of the base station controllers 209, 210.

The uplink channel processing will first be described.

Respective signals supplied from a plurality of radio base stations are inputted to a concentrator/ distributor 702 through associated radio base station interfaces 701. The concentrator/distributor 702 has a function of routing such signals to appropriate selector elements 703 in accordance with an instruction from a control processor 705.

Each of the selector element 703 is a circuit which corresponds one by one to a mobile station currently in communication. When a soft handoff is under way, one selector element is provided with signals from a plurality of radio base stations. In this event, the selector element 703 selects the signal having the highest quality based on quality information or the like included in the signals from the respective radio base stations. In this way, the cell diversity effect is provided for the uplink channel. Next, the selector element 703 separates the supplied signal into control signals and transmission information. The selector element 703 interprets the contents of the control information, and transmits appropriate control signals to a switcher, radio base stations, and/or mobile stations associated therewith, if necessary. Also, the selector element 703 performs framing processing on the transmission information, and outputs the framed transmission information to a switch interface 704.

The switch interface 704 concentrates signals supplied from the respective selector elements 703, and outputs them to a switcher. The control processor 705 generally controls the base station controller for assignment of a selector element when a call is set, or the like.

Next, the downlink channel processing will be described.

The switcher interface 704 routes a signal supplied from a switcher to an appropriate selector element 703. The selector element 703 adds control signals transmitted to a radio base station and a mobile station to the signal received from the switcher interface 704, and supplies this signal to the concentrator/distributor 702. When a soft handoff is under way, each of the selector elements 703 transmits the same transmission information and the same control signal for a mobile station to a plurality of radio base stations. Simultaneously, each of the selector elements 703 transmits control signals for assignment of an orthogonal code and for setting an associated switch ON or OFF to the respective radio base stations.

The concentrator/distributor 702 routes signals in accordance with an instruction of the control processor 705 to transmit them to appropriate radio base stations through the associated radio base station interfaces 701.

4. Call Processing

An embodiment of call processing during a handoff will hereinafter be described with reference to FIGS. 8 to 16. In the following, this embodiment will be called "Embodiment 1." In Embodiment 1, consider that a mobile station 103 moves from a cell provided by a handoff initiated radio base station 101 to a cell provided by a handoff destined radio base station 102. Assume herein that the two radio base stations belong to the same base station controller 210. Also, in Embodiment 1, the number of partial channels is chosen to be two.

Figure 8:
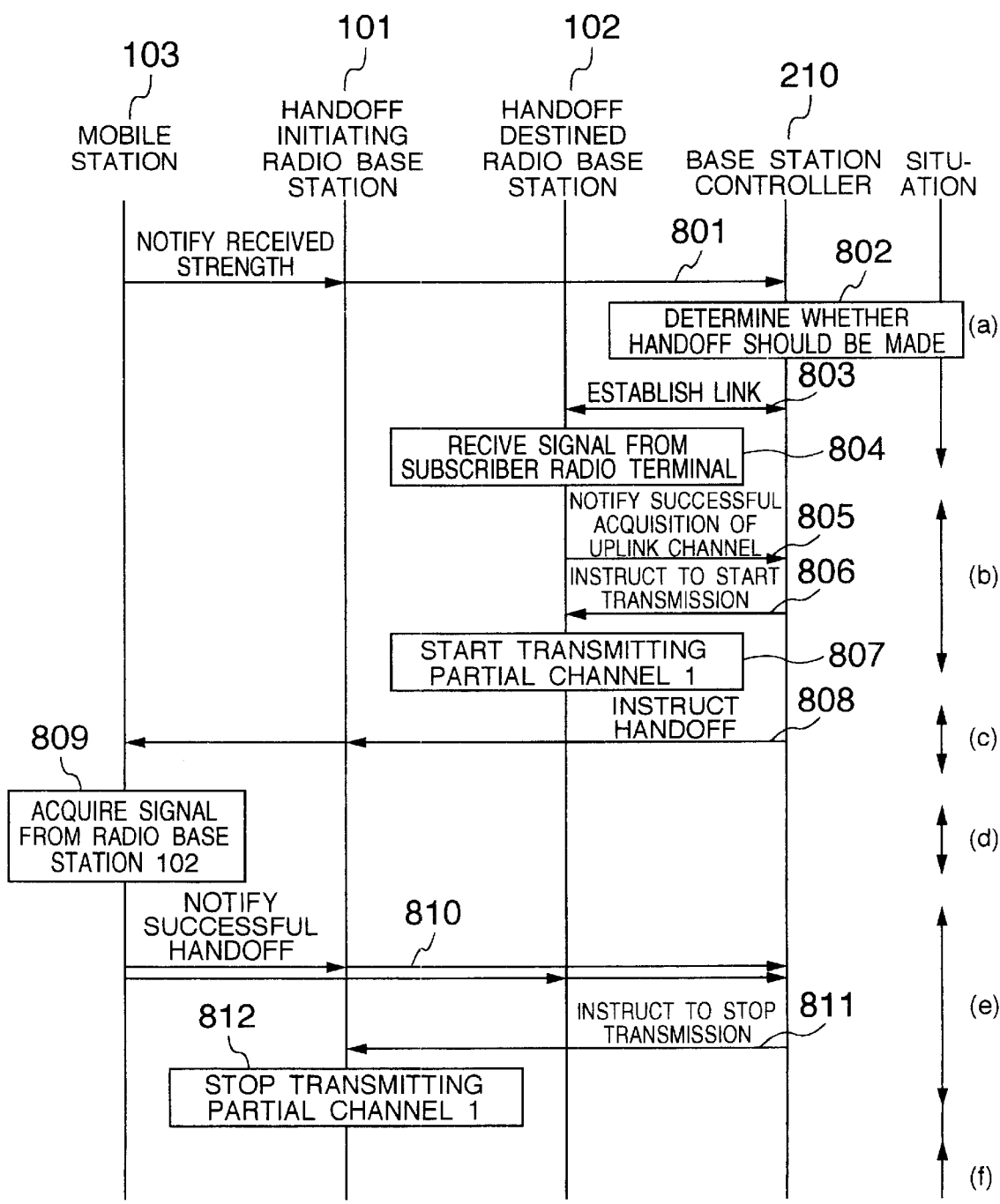
FIGS. 8 and 9 are flow diagrams illustrating an example of call processing according to the present invention.
Figure 9:
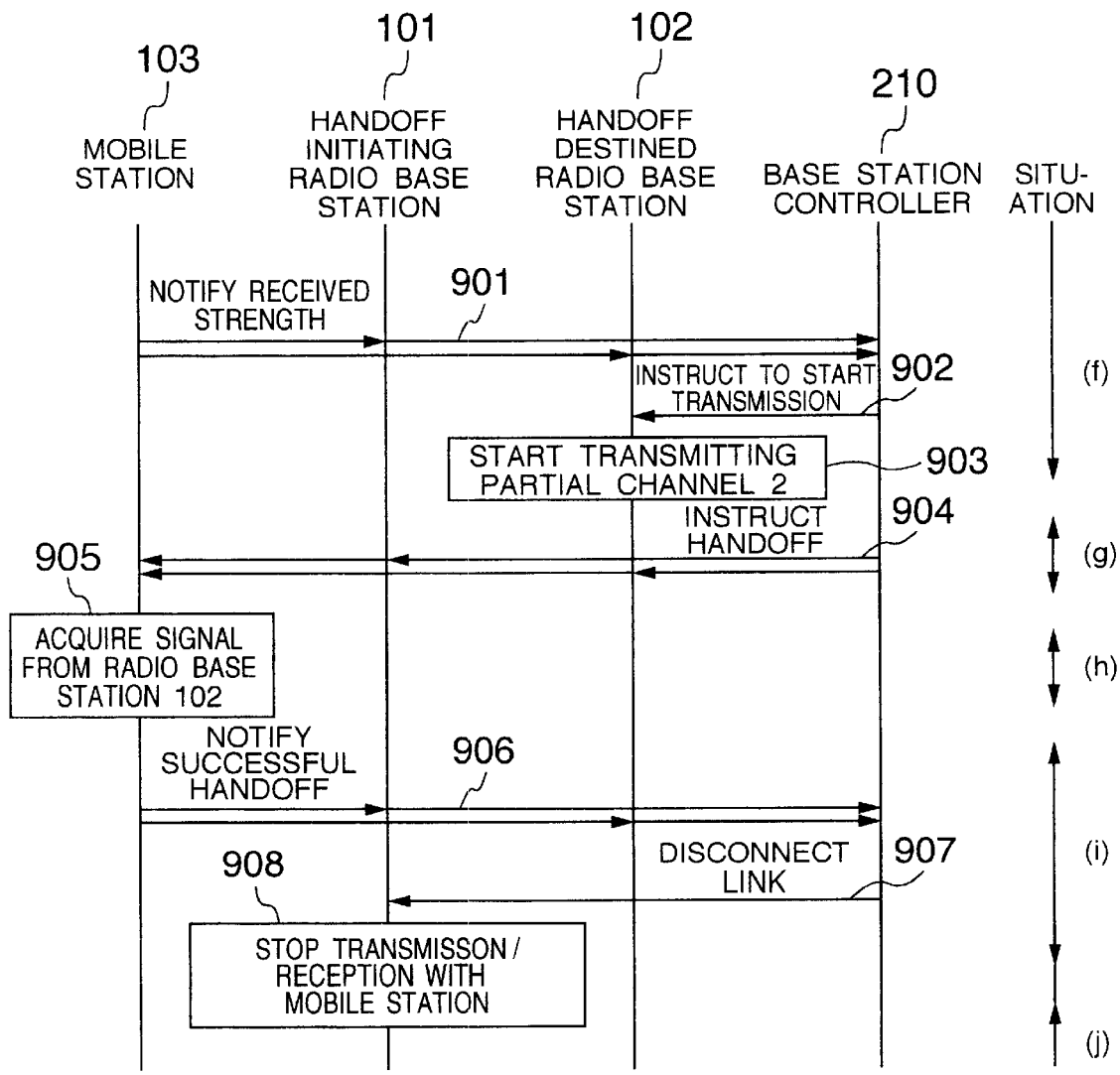
Figure 10:
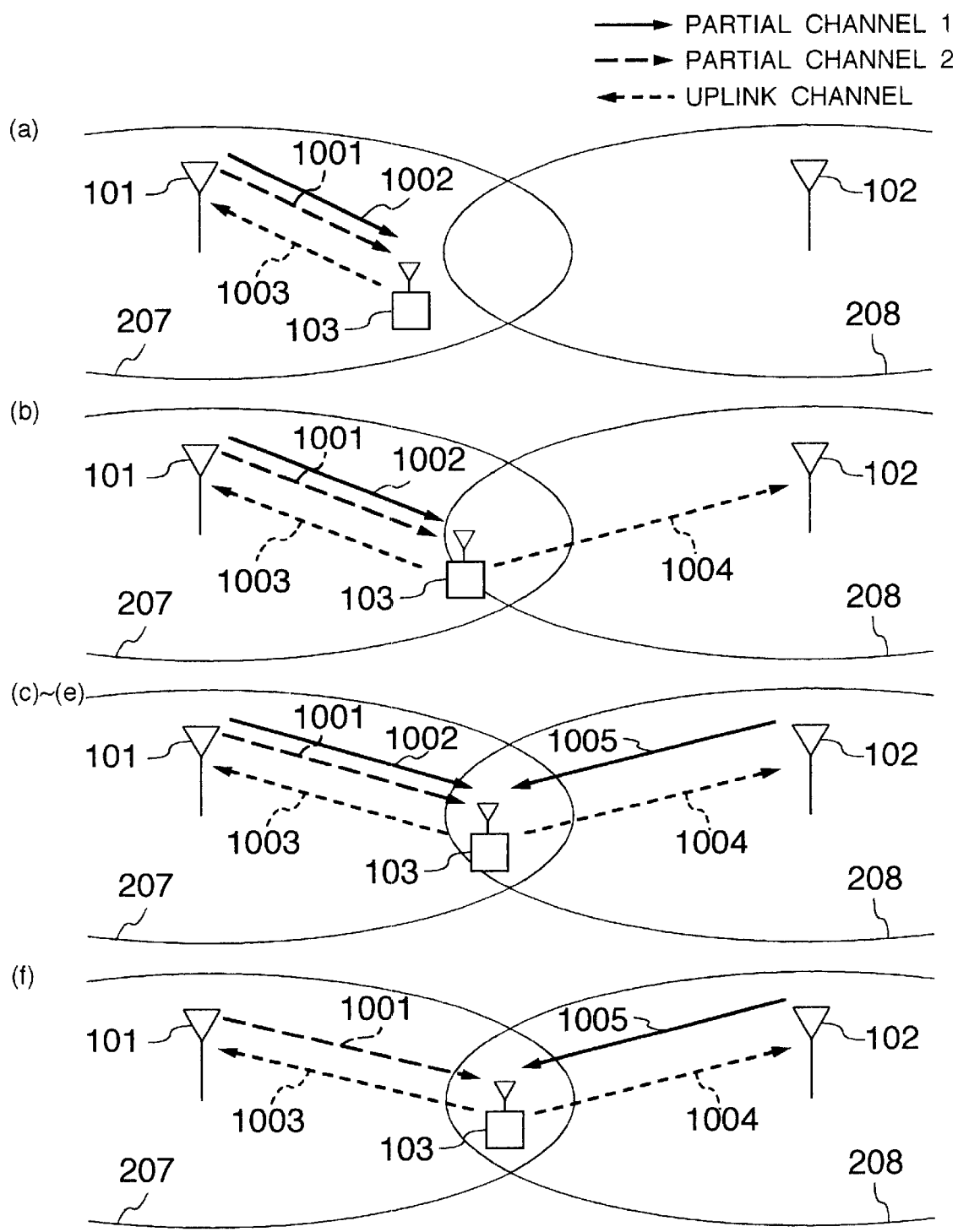
FIGS. 10 and 11 are diagrams describing how a handoff is processed in an embodiment of the present invention.
Figure 11:
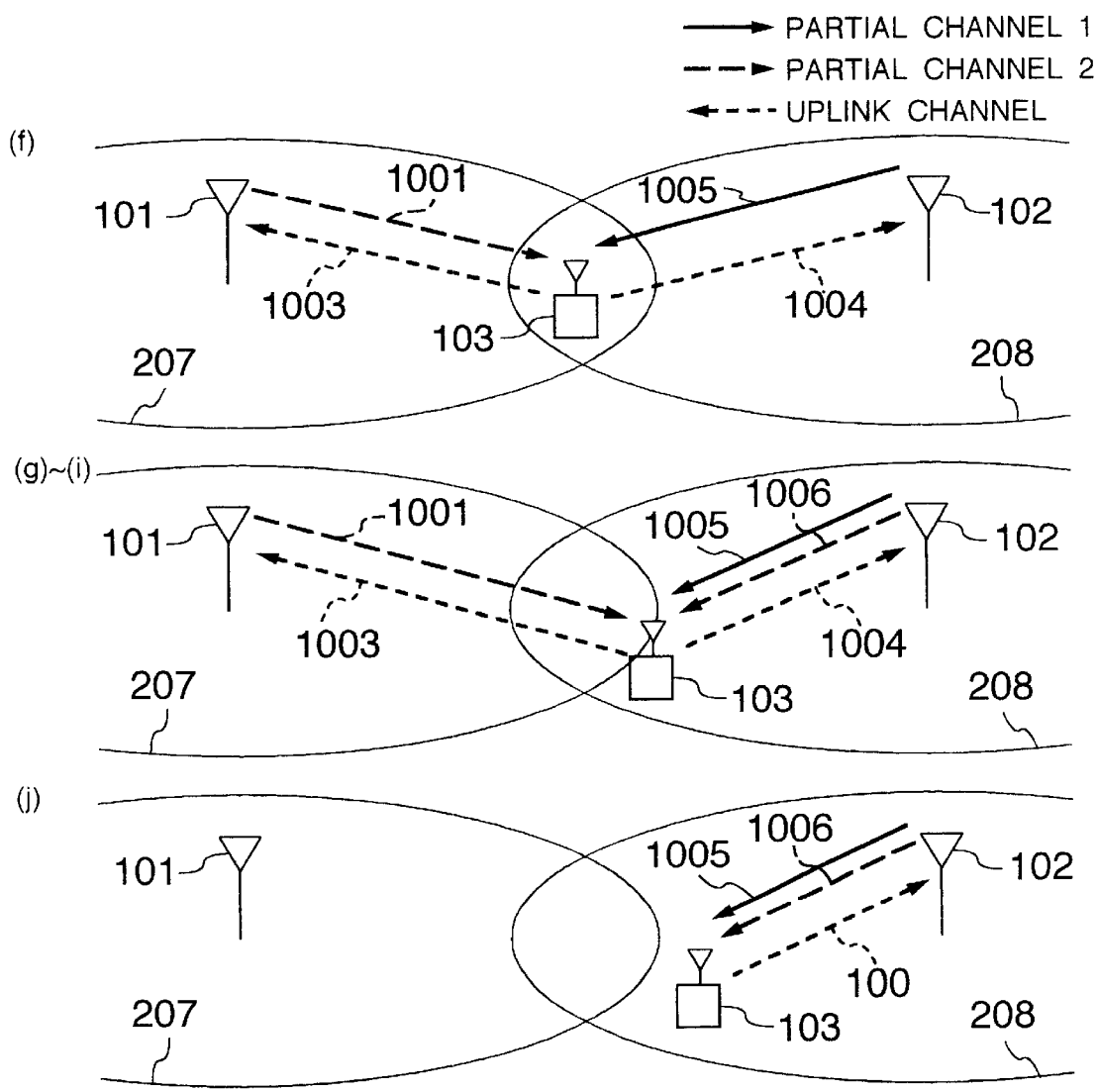
Figure 12:
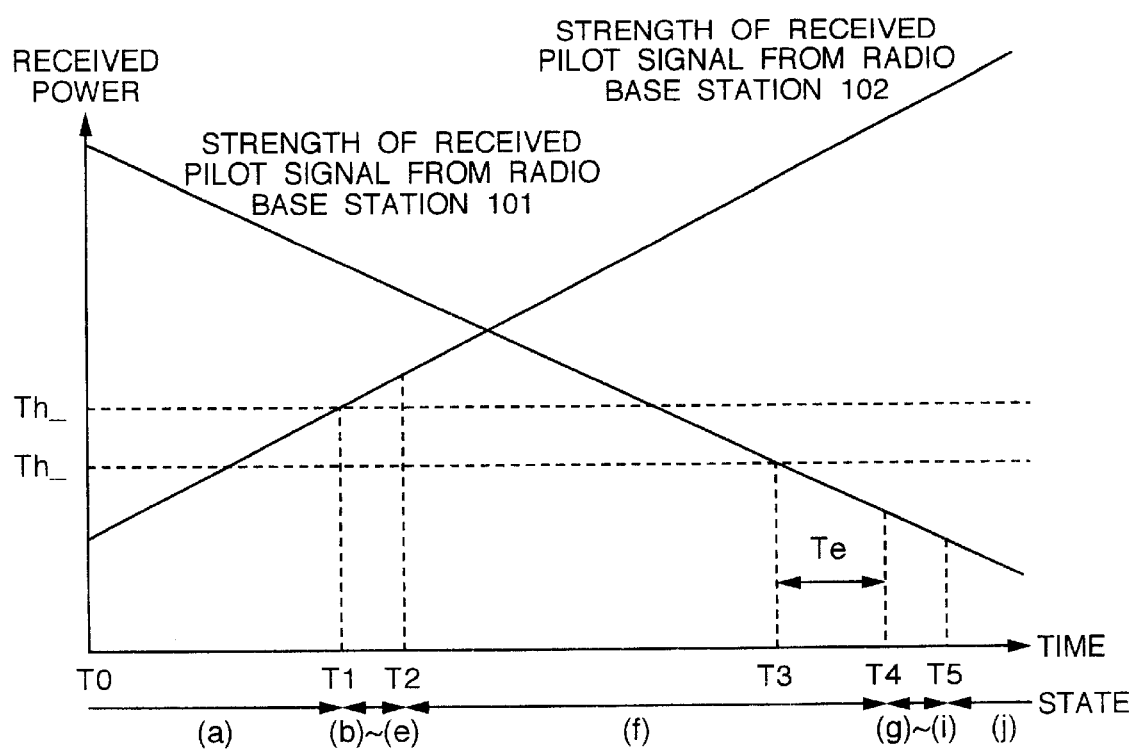
FIG. 12 is a graph for explaining a pilot signal reception power in an embodiment of the present invention.

FIGS. 8 and 9 describe signals transmitted between the mobile terminal 103, the radio base station 101 and the base station controller 210. FIGS. 10 and 11 illustrate communication states between the mobile station 103 and the two radio base stations in respective states shown in FIGS. 8 and 9. A downlink channel is indicated by arrows in the drawings when the radio base station is transmitting to the mobile station, while an uplink channel is indicated by arrows when the radio base station is receiving a transmission from the mobile station. FIG. 12 shows changes in the strengths of pilot signals from the two radio base stations received at the mobile station 103.

Figure 13:
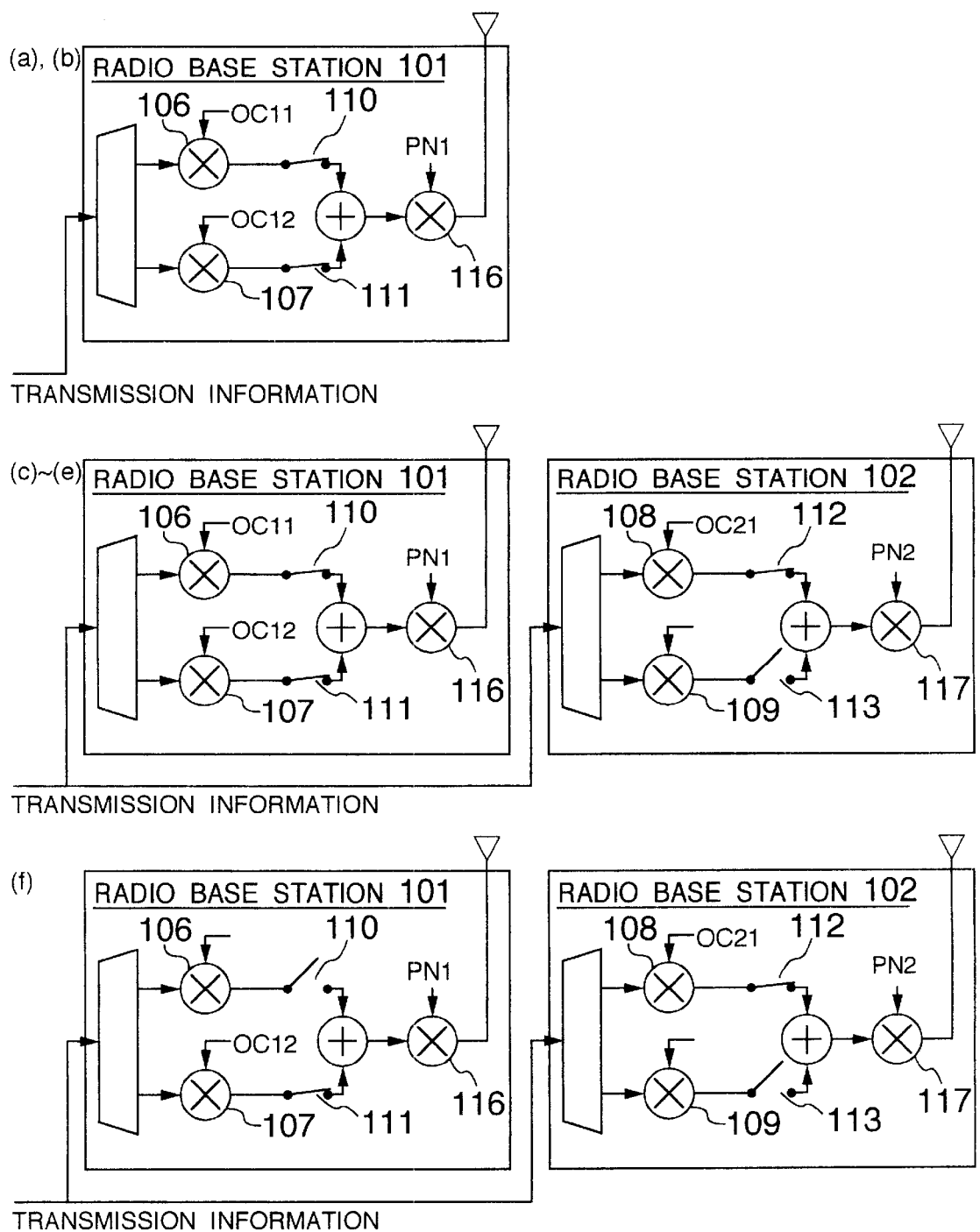
FIGS. 13 and 14 show how channel elements in a radio base station change in an embodiment of the present invention.
Figure 14:
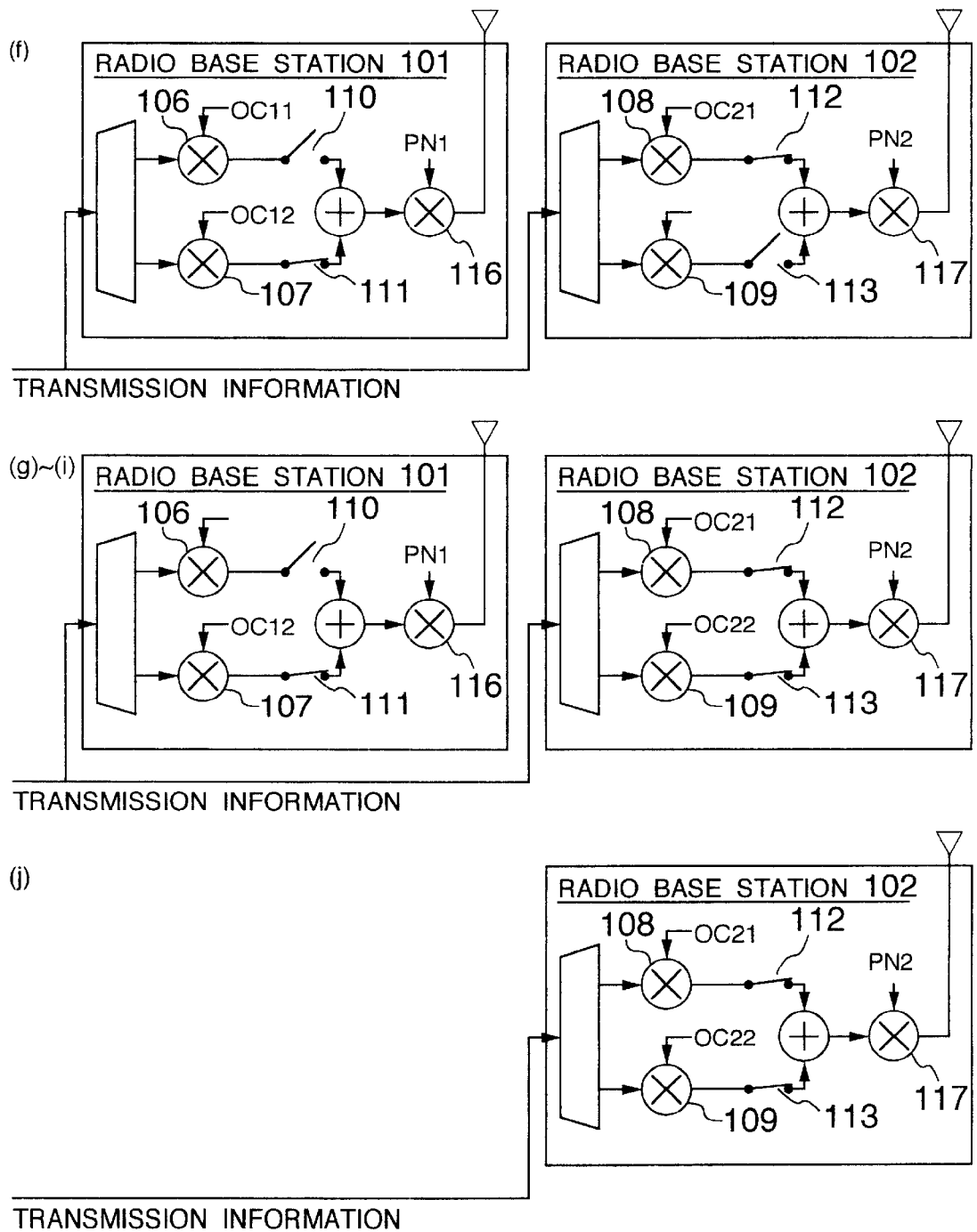

FIGS. 13 and 14 illustrate the states of spreaders, switches and modulators within the transmission systems of the two radio base stations in the respective states shown in FIGS. 8 and 9.

Figure 15:
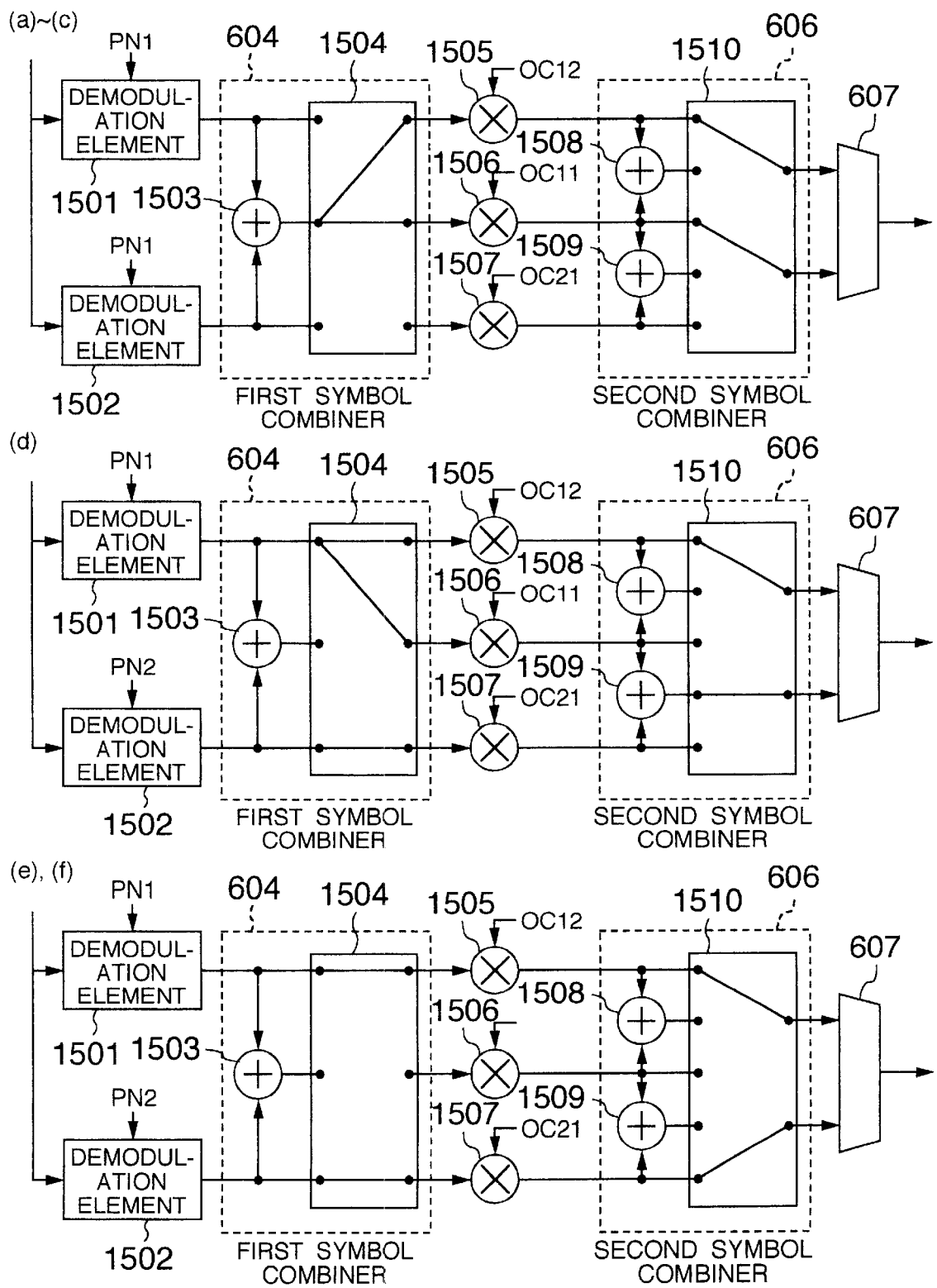
FIGS. 15 and 16 show how a despread circuit in a mobile station changes in an embodiment of the present invention.
Figure 16:
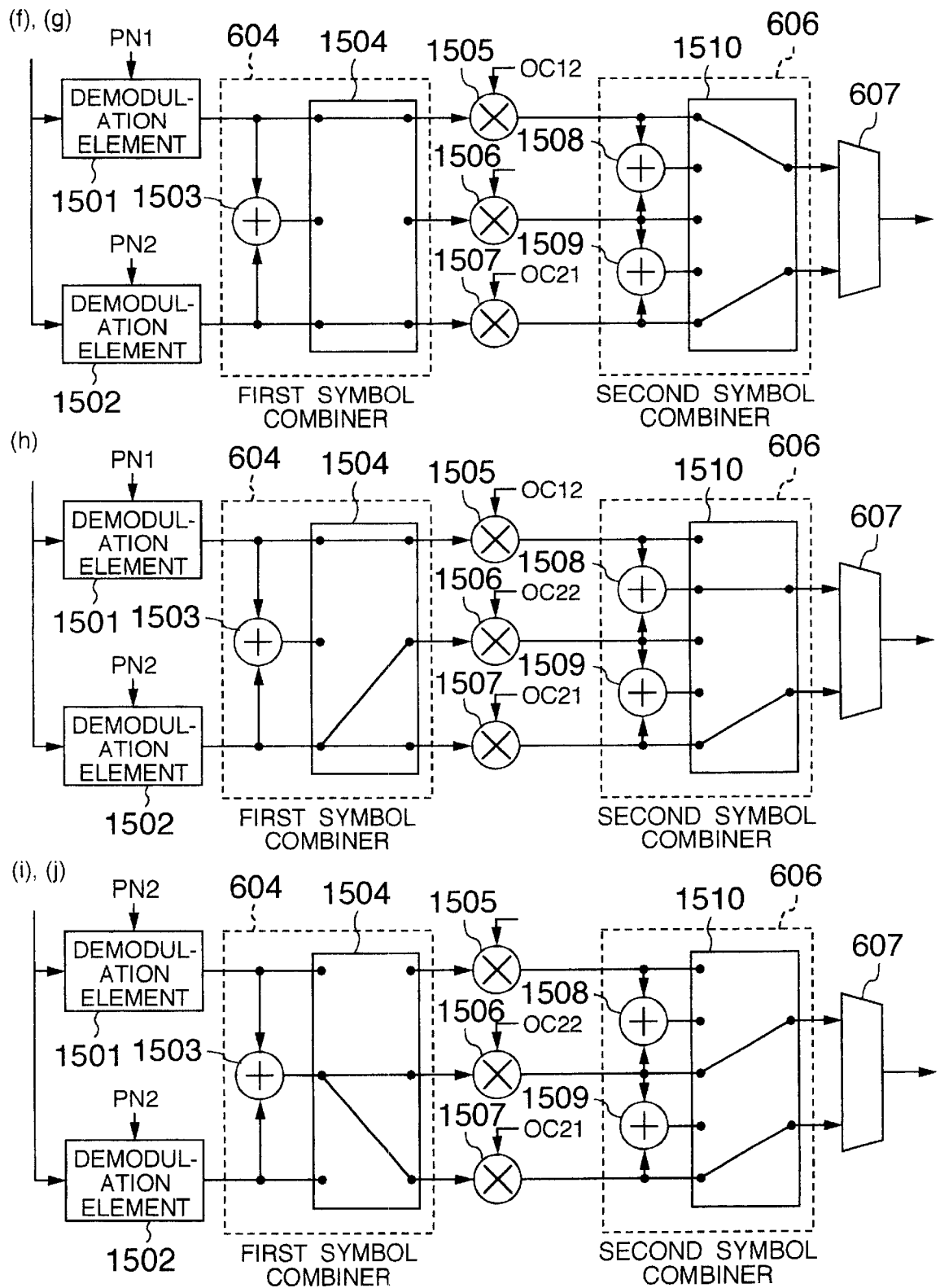

FIGS. 15 and 16 illustrate the states of a despreader circuit in the reception system of the mobile station in the respective states shown in FIGS. 8 and 9. For simplicity, the number of demodulation elements is chosen to be two. Also, the control processor and the signal search element are not illustrated. It should be noted that since Embodiment 1 describes a scenario that the mobile station moves from the radio base station 1 to the radio base station 2, and a handoff is first initiated in a first partial channel, followed by a handoff in a second partial channel. Actually, however, the handoff of the first partial channel and the handoff of the second partial channel may not be necessarily made in succession. Specifically, Section 4.1 describes an implementation of the mobile station which transitions from a state in which "it is communicating with N radio base stations" to a state in which "it is communicating with N+1 radio base stations," while Section 4.2 describes an implementation of the mobile station which transitions from a state in which "it is communicating with N+1 radio base stations" to a state in which "it is communicating with N radio base stations." These implementations represent completely distinct matters. For example, the mobile station may return to communicate only with the radio base station 1 by again handing off the first partial channel after the first partial channel has once been handed off. Stated another way, in principle, handoffs of partial channels may be independent matters of each other, or one may be subordinate to the other.

4.1 Transition to Handoff State

Referring to FIGS. 8, 10, 12, 13 and 15, description will be first made on the processing involved in a transition from a state in which the mobile station 103 is communicating only with the radio base station 101 to a state in which the mobile station 103 receives partial channels, one from each of the two radio base stations. In Embodiment 1, a handoff is initiated at a time when the strength of a pilot signal from the radio base station 102 received at the mobile station 103 exceeds a threshold value Th_a.

State (a) is an initial phase of Embodiment 1. As illustrated in FIG. 10, in this state, the mobile station 103 belongs to a service area 104 of the radio base station 101 but does not belong to a service area 105 of the radio base station 102. The mobile station 103 is communicating only with the radio base station 101 through a radio channels 106 to 108. As mentioned above, the mobile station 103 periodically measures the strengths of received pilot signals except for those from the radio base station 101 in the signal search element 601. In Embodiment 1, the control processor 507 is comparing the received pilot signal strength with the threshold value Th_a at all time. From time T0 to time T1 in FIG. 12, since the strength of the received pilot signal from the radio base station 102 is below the threshold value Th_a, no handoff is initiated.

FIG. 13 illustrates the state of the radio base station 101 in Situation (a). In this state, both partial channels are transmitted from the radio base station 101. The two partial channels are assigned orthogonal codes OC11, OC22 in correlators 106, 107, respectively, and switches 110, 111 are ON. The two partial channels are spread with a PN code PN1 in a PN code spreader 116, and then transmitted through an RF unit.

Described next is the state of the mobile station 103 in Situation (a). When no handoff is made, the control processor assigns all demodulation elements to a signal from a single radio base station and its multipath component. The path diversity effect is provided by adjusting the timing of the signal in each of the demodulation elements and combining the timing adjusted signals in a first symbol combiner. Subsequently, the combined signal is despread by orthogonal code correlators corresponding to the respective partial channels to extract the respective partial channels. A second symbol combiner appropriately corresponds the respective partial channels to input terminals of a multiplexer 607. Finally, the signals are multiplexed in the multiplexer 607 to restore the original signal. In FIG. 15, both demodulation elements are assigned a PN code PN1. The demodulation element 1501 is assigned to a main path signal, while the demodulation element 1502 is assigned to a multipath signal. The outputs of the two demodulation elements are combined by an adder 1503. The output of the adder 1503 is routed to orthogonal code correlators 1505, 1506 in a routing circuit 1504, and despread with orthogonal codes OC11, OC22 in the two orthogonal code correlators 1505, 1506 to extract the partial channels. In the second symbol combiner, the appropriately routed signals are restored to the original signal in the multiplexer 607.

At time T1 in FIG. 12, assume that the strength of the received pilot signal from the radio base station 102 exceeds the threshold value Th_a. Upon detecting the strength of a pilot signal with a particular offset exceeding the threshold value Th_1, the control processor 507 notifies the base station controller 210 through the radio base station 101 of the offset and the strength of the received pilot signal which has exhibited the strength exceeding the threshold value (801). The base station controller 210 determines from the offset that the pilot signal detected by the mobile station 103 is a pilot signal from the radio base station 102, and confirms that the radio base station 102 belongs to this base station controller 210 and that the radio base station 102 has sufficient radio resources to make a handoff (802). Upon determining that a handoff can be made, the base station controller 210 establishes a link between itself and the radio base station 102 (803).

The radio base station 102 searches for a transmission signal from the mobile station 103 based on information from the base station controller 210 (804), and after it has successfully acquired an uplink channel, notifies the base station controller 210 of the successful acquisition of the uplink channel (805). At this time, Situation (b) is entered. As illustrated in FIG. 10, in Situation (b), only uplink channels are being received by both of the radio base stations. In the base station controller, signals supplied from the two radio base stations are combined in a maximum ratio form or in a selective manner, whereby the uplink channels are placed in a cell diversity mode. Subsequently, the cell diversity mode is maintained for the uplink channels until a handoff is completed.

Upon notification of the successful acquisition of an uplink channel from the radio base station 102, the base station controller 210 assigns a new orthogonal code to the radio base station 102, and simultaneously switches the setting of the switch to transmit a command signal to start transmitting the partial channel 1 (806). Also, the base station controller 210 transmits the orthogonal code newly assigned to the radio base station 102 to the mobile station 103 through the radio base station 101, to instruct the mobile station 103 to receive the partial channel 1 transmitted by the radio base station 102.

Upon receipt of the instruction, the radio base station 102 starts transmitting only the partial channel 1 (1005) (807). As illustrated in FIG. 13, this may be realized by assigning an orthogonal code OC21 newly supplied from the base station controller 210 to the orthogonal code spreader 108 in the radio base station 102, and simultaneously turning ON the switch 112 corresponding to the output of the orthogonal code spreader 108 to which the orthogonal code is assigned. At this time, Situation (c) is entered. As illustrated in FIG. 10, the transmission of a signal 1005 is started toward the mobile station 103. On the other hand, the mobile station 103, which has received the instruction, starts receiving the partial channel 1 transmitted by the radio base station 102. This may be realized in the following manner. First, the offset of the radio base station 102 found by using the signal search element is assigned to the demodulation element having the lowest received strength of all demodulation elements currently used in a RAKE combination. Simultaneously, the output of this demodulation element is despread with the orthogonal code assigned to the radio base station 102. Subsequently, the partial channels 1 transmitted from the two radio base stations are combined in the second symbol combiner, and then multi-plexed by the multiplexer. In FIG. 15, the demodulation element 1502, which has been assigned to the multipath signal of the radio base station 101, is assigned to the radio base station 102. Simultaneously with this, the orthogonal code OC21 is assigned to an orthogonal code correlator 1507 which has not been used, while the routing circuit 1504 routes the output of the demodulation element 1501 assigned to the radio base station 101 to the orthogonal code correlators 1505, 1506 which have been assigned OC11, OC12, respectively, and routes the output of the demodulation element 1502 assigned to the radio base station 102 to the orthogonal code correlator 1507 which has been assigned OC21. In this way, the partial channels 1 are extracted from the orthogonal code correlators 1506, 1507, while the partial channel 2 is extracted from the orthogonal code correlator 1505. The partial channels 1 transmitted from the two radio base stations are combined by an adder 1509 to increase the cell diversity effect. Subsequently, the signals appropriately routed by the routing circuit 1510 are restored to original signals in the multiplexer 607. At this time, Situation (d) is entered.

The mobile station 103 measures the output power of the orthogonal code correlator assigned to the radio base station 102, and determines that the partial channel 1 transmitted by the radio base station 102 has been successfully acquired at the time the measured output power exceeds a threshold value (809). After the determination, the mobile station 103 stops receiving the partial channel 1 transmitted by the radio base station 101. In FIG. 15, this may be realized in the following manner. The output power of the orthogonal code correlator 1507 is measured, and the routing circuit 1504 stops the output to the orthogonal code correlator 1506 at the time the value of the measured output power exceeds the threshold value. Simultaneously, the routing circuit 1510 releases the correlator currently assigned to the partial channel 1 transmitted by the radio base station 101. At this time, Situation (e) is entered.

Simultaneously, the mobile station 103 notifies the base station controller of the successful handoff through both of the radio base stations (810). Upon receipt of the notification of the successful handoff, the base station controller instructs the radio base station 101 to turn OFF the switch 110 corresponding to the partial channel 1 (811). The radio base station 101 turns OFF the switch 110 as instructed. The orthogonal code OC11, so far used by the radio base station 101 for the partial channel 1, is released so that it is available for another radio base station (812). At this time, Situation (f) is entered.

In Situation (f), the mobile station 103 is receiving the partial channel 1 exclusively from the radio base station 102 and the partial channel 2 exclusively from the radio base station 101. In this state, signals are simultaneously received from a plurality of radio base stations, multi-plexed, and deinterleaved to produce a sequence which is then inputted to the decoder. As mentioned above, since the received power of this sequence is considered to be an average of the powers received from the two radio base stations, a frame error probability of signals decoded from the sequence is lower as compared with that of signals received exclusively from the radio base station experiencing a worse radio situation. In other words, the cell diversity effect is ensured. Also, since each of the partial channels is transmitted only from one of the two radio base stations, the amount of used radio resources is the same as that required when no handoff is made, from a viewpoint of the entire system.

4.2 End of Handoff State

Next, referring to FIGS. 9, 11, 12, 14 and 16, description will be made on the processing involved from a state in which the mobile station 103 receives partial channels, one from each of the two radio base stations, to a state in which the mobile station 103 is communicating only with the radio base station 102. Time T2 in FIG. 12 indicates a time at which Situation (f) is entered. In Embodiment 1, a trigger for ending a handoff is the strength of a received pilot signal from the radio base station 101 which becomes below a threshold value Th_b. Assume that the strength of the received pilot signal from the radio base station 101 becomes below the threshold value Th_b at time T3 in FIG. 12. It should be noted however that at time T3 the processing for ending a handoff is not immediately started, but instead a handoff end timer is set in order to prevent the handoff from ending in response to a temporarily decreased strength of the pilot signal due to fading or the like. If the strength of the received pilot signal from the radio base station 101 does not exceed at all the threshold value Th_b until the timer times out at time T4, the handoff end processing is started. If the strength of the received pilot signal exceeds the threshold value Th_b, the handoff end timer is cleared.

After the handoff end timer has timed out, the mobile station 103 notifies the base station controller 210 of the strength of the received pilot signal from the radio base station 101 through both radio base stations (901). The base station controller 210 confirms that the radio base station 102 has sufficient radio resources to make a handoff. The base station controller 210, when determining that a handoff can be made, assigns a new orthogonal code OC22 to the radio base station 102, and simultaneously switches the setting of the switch to instruct the radio base station 102 to start transmitting a partial channel 2 (902). Simultaneously, the base station controller 210 transmits the orthogonal code OC22 newly assigned to the radio base station 102 to the mobile station 103 through both radio base stations, and instructs the mobile station 103 to receive the partial channel 2 transmitted by the radio base station 102.

Upon receipt of the instruction, the radio base station 102 starts transmitting the partial channel 2 (903). As illustrated in FIG. 14, this may be realized by assigning the newly supplied orthogonal code OC22 from the base station controller 210 to an orthogonal code spreader 109 in the radio base station 102, and simultaneously turning ON a switch 113 corresponding to the output of the orthogonal code spreader 109 to which the orthogonal code is assigned. At this time, Situation (g) is entered. As illustrated in FIG. 10, the transmission of a signal 1006 is started toward the mobile station 103 (903). Upon receipt of the instruction, the mobile station 103 starts receiving the partial channel 2 transmitted by the radio base station 102. This may be realized in the following manner. The output of a demodulation element currently assigned to the radio base station 102 is despread with the orthogonal code OC22 newly assigned to the radio base station 102. The partial channels 2 transmitted from the two radio base stations are combined in the second symbol combiner and then multi-plexed by the multiplexer. In FIG. 16, a demodulation element 1502 is assigned to the radio base station 102. Simultaneously with this, the orthogonal code OC22 is assigned to the orthogonal code correlator 1506 which has not been so far used. The routing circuit 1504 routes the output of the demodulation element 1501 assigned to the radio base station 101 to the orthogonal code correlator 1505 to which OC11 has been assigned, and the output of the demodulation element 1502 assigned to the radio base station 102 to the orthogonal code correlators 1506, 1507 to which OC22, OC21 have been assigned, respectively. In this way, the partial channel 1 is extracted from the orthogonal code correlator 1507, while the partial channels 2 are extracted from the orthogonal code correlators 1505, 1506. The partial channels 2 transmitted from the respective radio base stations are combined by an adder 1508 to increase the cell diversity effect. Subsequently, the signals appropriately routed by the routing circuit 1510 are restored to original signals in a multiplexer 607. At this time, Situation (h) is entered.

The mobile station 103 measures the output power of the newly assigned orthogonal correlator, and determines that the partial channel 2 transmitted by the radio base station 102 has been successfully acquired at the time the measured output power exceeds a threshold value (905). After the determination, the mobile station 103 stops receiving all signals transmitted from the radio base station 101. Specifically, all demodulation elements assigned to the radio base station 101 are reassigned to the radio base station 102, and simultaneously, all signals are combined by the first symbol combiner. The output of the first symbol combiner is despread by orthogonal code correlators corresponding to the respective partial channels, and the second symbol circuit is switched for appropriately routing the partial channels. In FIG. 16, the demodulation element 1501 assigned to the radio base station 101 is assigned to a multipath signal of the radio base station 102, and the outputs of the demodulation elements 1501, 1502 are combined by the adder 1503. The output of the adder 1503 is routed to the orthogonal code correlators 1506, 1507 in the routing circuit 1504. Both partial channels extracted by the respective orthogonal code correlators are appropriately routed in the second symbol combiner. At this time, Situation (f) is entered.

The mobile station 103 notifies the base station controller 210 of the successful handoff through both of the radio base stations (906). Upon receipt of the notification of the successful handoff, the base station controller 210 instructs the radio base station 101 to end the handoff, and then disconnects a link to the radio base station 101 (907). The radio base station 101 terminates a communication with the mobile station 103 (908). More specifically, the radio base station 101 releases a channel element assigned to the mobile station 103 after turning OFF the switch 111. The orthogonal code and channel element used by the radio base station 101 for the mobile station 103 are released so that they are available for another mobile station. At this time, Situation (j) is entered. Consequently, the mobile station 103 proceeds to a state in which it is communicating only with the radio base station 102.

5. Other Embodiments 5.1 Alternative Configuration of Despread Circuit in Reception System of Mobile Station The despread circuit 504 illustrated in FIG. 6 has two symbol combiners such that the number of used orthogonal code correlators is minimized by performing a RAKE combination in the first symbol combiner 604. Contrary to this configuration, it is also possible to provide a redundant number of used orthogonal code correlators to reduce the number of symbol combiners to one.

Figure 17:
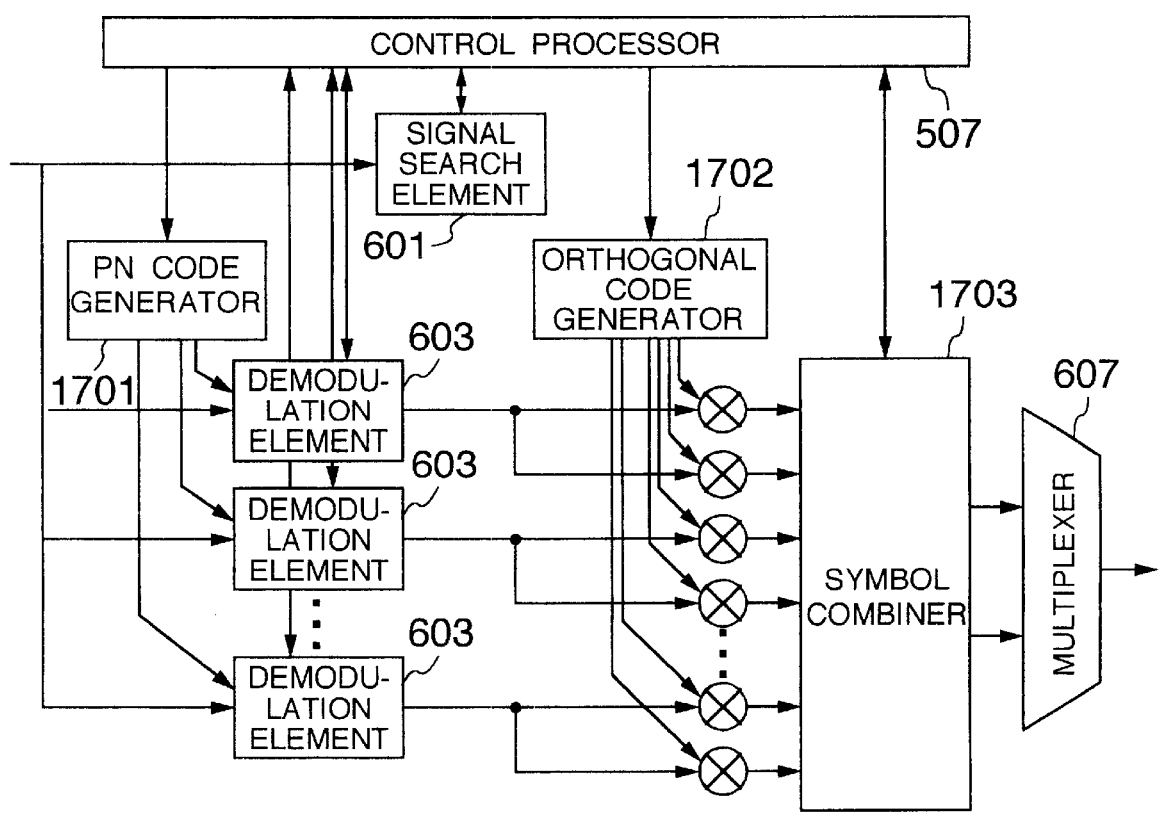
FIG. 17 is a block diagram illustrating a despread circuit in a reception system of a mobile station according to a second embodiment of the present invention.

FIG. 17 illustrates an embodiment of the configuration as mentioned. In this embodiment, the number of partial channels are chosen to be two. A signal search element 601, demodulation elements 603 and a multiplexer 607 operate in the same manner as their counterparts in FIG. 6. A PN code generator 1701 assigns orthogonal codes to the respective demodulation elements 603.

The output of each of the demodulation elements 603 is inputted to corresponding orthogonal code correlators, the number of which is equal to the number of partial channels. Each orthogonal code correlator corresponds to each partial channel. An orthogonal code generator 1702 assigns orthogonal codes to the respective partial channels in a one-by-one corresponding relationship. The respective partial channels extracted by despreading are inputted to a symbol combiner 1703.

The symbol combiner 1703 has the functions of the first symbol combiner 604 and the second symbol combiner 605 illustrated in FIG. 6. More specifically, the symbol combiner 1703 simultaneously combines a main path signal and a multipath signal transmitted from the same base station in units of partial channels, and combines the same partial channels transmitted from different radio base stations to simultaneously provide the path diversity effect and cell diversity effect.

Figure 18:
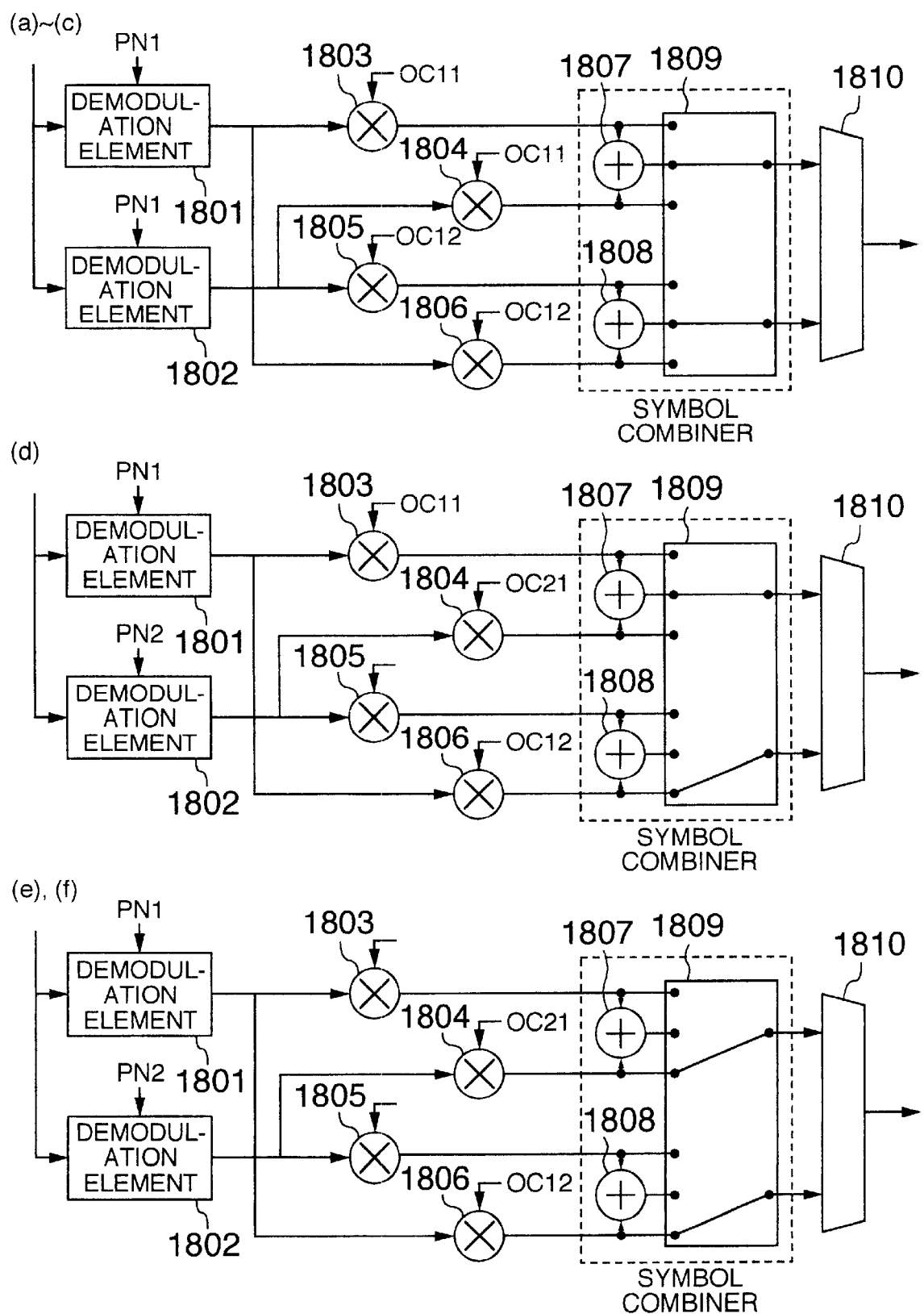
FIG. 18 shows how a despread circuit in a mobile station changes in the second embodiment of the present invention.

FIG. 18 illustrates an exemplary operation performed by the configuration of FIG. 17, showing Situations (a)–(f) corresponding to FIG. 15. Orthogonal code correlators 1803, 1804 are fixed for use with a partial channel 1, while orthogonal code correlators 1805, 1806 are fixed for use with a partial channel 2.

In Situations (a)–(c), both of the demodulation elements are assigned to a signal from the radio base station 101. The signal is despread with OC11 in the orthogonal code correlators 1803, 1804 to extract the partial channels 1 which are combined in an adder 1807 to provide the path diversity effect. Similar operations are also applied to the partial channel 2. A routing circuit 1809 is set to select outputs from the adders for both partial channels.

In Situation (d), the demodulation element 1802 is assigned to the radio base station 102. A signal from the radio base station 102 is despread with OC21 in the orthogonal code correlator 1804 to extract a partial channel 1 which is combined with the partial channel 1 transmitted from the radio base station 101 in the adder 1807 to increase the cell diversity effect. In this event, the orthogonal code correlator 1805 is not used, so that the routing circuit 1809 is switched to extract the partial channel 2 from the orthogonal code correlator 1806.

In Situations (e), (f), the orthogonal code correlator 1803 is not used, and the routing circuit 1809 is switched to extract the partial channel 1 from the orthogonal code correlator 1804. Situations (g)–(j) may be realized by similar processing.

While in the configurations illustrated in FIGS. 6 and 17, the symbol combiners have a plurality of functions including a combination function implemented by the adders, and a routing function implemented by the routing circuits, it may also be contemplated that the adders for cell diversity be omitted from the configuration.

Figure 19:
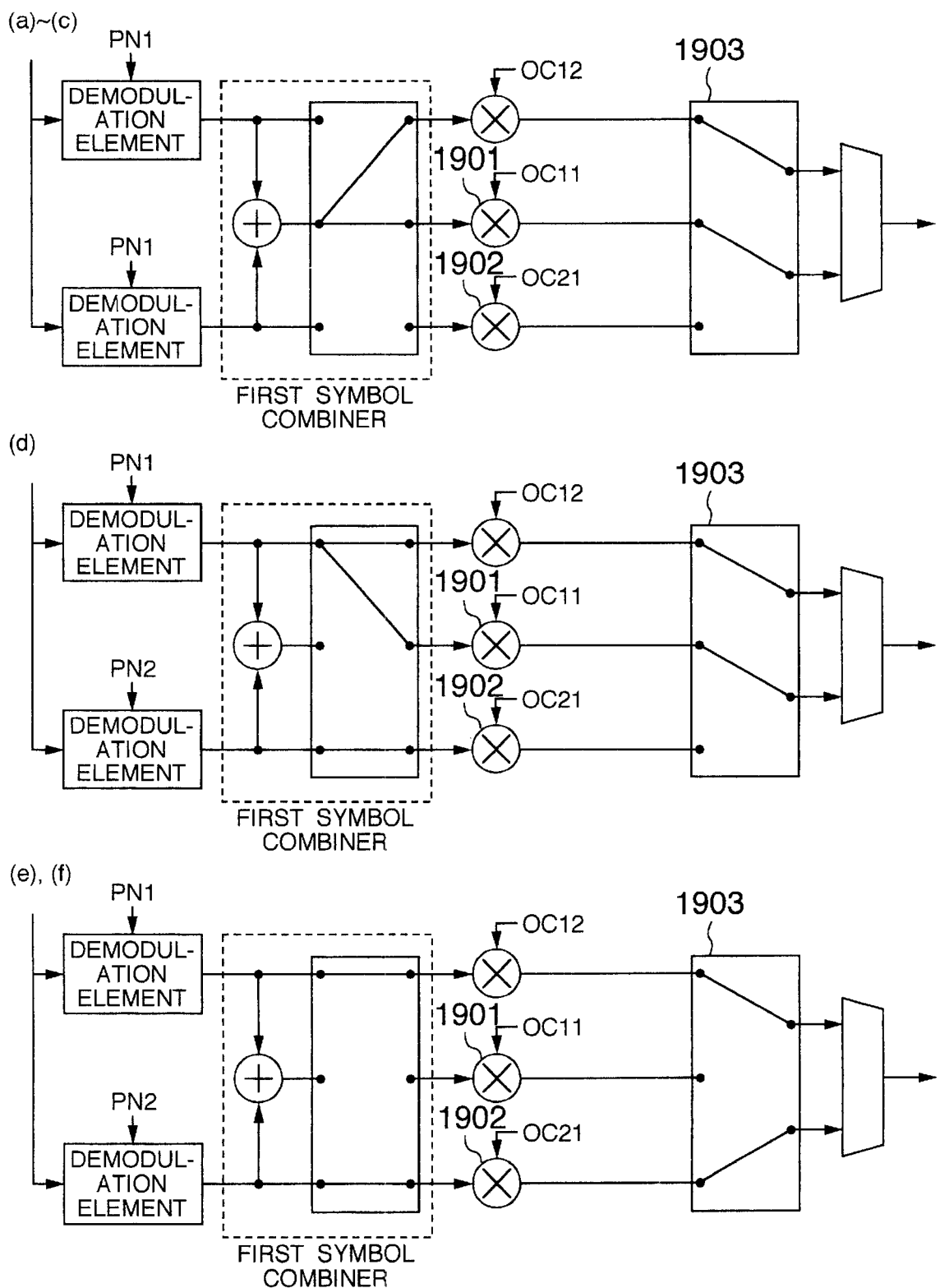
FIG. 19 shows how a despread circuit in a mobile station changes in a third embodiment of the present invention.

FIG. 19 illustrates an embodiment of the configuration as mentioned, where the adders are omitted from the second symbol combiner in FIG. 15. The configuration in Situations (a)–(c), (e) and (f) are completely the same as those in FIG. 15.

In Situation (d), the routing circuit 1903 only routes the output of an orthogonal code correlator 1901 as the partial channel 1. The output of an orthogonal code correlator 1902 is used only for measuring a received power. When the output power of the orthogonal code correlator 1902 exceeds a threshold value, it is determined that the mobile station has successfully received the partial channel 1 transmitted from the base station 102, so that the routing circuit 1903 is switched to route only the output of the orthogonal code correlator 1902 as the partial channel 1.

5.2 Alternative Configuration for Call Processing

The call processing in Embodiment 1 requires, as a handoff initiated condition, that the strength of a received pilot signal from a radio base station currently not in communication exceeds a threshold value, and as a handoff ending condition, that the strength of a received pilot signal from a radio base station currently in communication remains below the threshold value for a predetermined time period.

Other conditions may be employed for the handoff initiating/ending conditions. For example, it is contemplated that the handoff initiating condition defines that the strength of a received pilot signal from a radio base station currently in communication remains below a threshold value for a predetermined time period, while the handoff ending condition is left indefinite, and a handoff for the partial channel 2 is immediately initiated after a handoff for the partial channel 1 has been ended.

As another example, it is also contemplated that the handoff initiating condition is determined by the base station controller. For example, the base station controller may determine the handoff initiating condition from a frame error rate periodically transmitted from a mobile station for initiating a handoff.

5.3 Diversity Reception

In Embodiment 1, the combination of respective partial channels transmitted from a plurality of radio base stations is limited only for a period until the mobile station confirms the acquisition of a partial channel transmitted from a radio base station to which it will be handed off. Alternatively, it is contemplated that part of partial channels may be continuously transmitted from a handoff initiated radio base station, even after a mobile station has acquired a partial channel transmitted from a handoff destined radio base station, such that the mobile station continuously combines the partial channels. In this case, although the number of used radio resources is increased as compared with that required when no handoff is made (still smaller than the conventional handoff method), the cell diversity effect is increased to be close to the cell diversity effect of the conventional handoff method.

When this alternative configuration is applied to Embodiment 1, the base station controller does not transmit a transmission stop instruction after it receives a notification of a successful handoff in FIG. 8. The transmission of the partial channel 1 is stopped at the time the link is disconnected, in the same manner as the partial channel 2. In the radio base station 101, it is equivalent to the switch 110 in FIGS. 13 and 14 which remains ON until Situation (i). The processing associated with the radio base station 102 is left unchanged. In the mobile station 103, the orthogonal code correlator 1506 in FIG. 15 is assigned an orthogonal code OC11 up to Situation (g), and the routing circuit 1510 routes the partial channel 1 from the adder 1509. Upon receipt of an handoff instruction associated with the partial channel 2, the routing circuit 1510 switches the orthogonal code correlator 1506 to OC22. In this way, the foregoing alternative configuration is realized.

5.4 Change in Number of Partial Channels

In Embodiment 1, a signal is always divided into a plurality of partial channels before transmission even when no handoff is made. In an alternative, it is also contemplated that a radio base station transmits a signal through a full channel as before when no handoff is made, transitions to a mode for transmitting the signal through a plurality of partial channels when an handoff is initiated, and returns again to the transmission of the signal through the full channel after the handoff has been ended.

Description is given on an example of the processing for proceeding from a full-channel transmission mode to a partial channel transmission mode upon initiating a handoff. When the base station controller determines to make a handoff, and is notified from the radio base station 102 of successful acquisition of an uplink channel by the mobile station 103, the base station controller gives orthogonal codes for all partial channels to the radio base station 101 and the mobile station 103 before sending a transmission start instruction to the radio base station 102, to instruct them to divide a transmission channel. The radio base station 101 uses the newly given orthogonal codes for partial channels to start partial channel transmission. At this time, full-channel transmission is being performed in parallel.

The mobile station 103 also uses an unused orthogonal code correlator to receive a partial channel to measure the strength of the received partial channel. At this time, full-channel reception is also being performed, so that information transmitted from the radio base station 101 is produced by decoding information acquired through the full-channel reception. When the strength of the received partial channel exceeds a threshold value, the mobile station 103 starts decoding information acquired through the partial channel reception from the next frame boundary, and terminates the full-channel reception. Simultaneously, the mobile station 103 notifies the base station controller of the successful reception of the partial channel through the radio base station 101.

Upon receipt of the notification, the base station controller sends a transmission start instruction to the radio base station 102. Subsequently, similar processing to that of Embodiment 1 is performed. Similar processing is also performed for a method of switching from the partial channel transmission to the full-channel transmission at the end of an handoff.

5.5 Criterion of Determination on Partial Channel Reception at Mobile Station In Embodiment 1, the criterion of the mobile station 103 to determine successful reception of a partial channel is defined by the strength of a received signal through the partial channel which exceeds a threshold value. An alternative criterion is contemplated for the determination. For example, the criterion of the determination may be an elapsed time after the mobile station 103 has started reception of a partial channel. Alternatively, a test signal may be inserted in a signal transmitted from the radio base station 102 such that successful detection of the test signal by the mobile station 103 may be used as the criterion of the determination.

6. Concept of Amount of radio Resources

Figure 20:
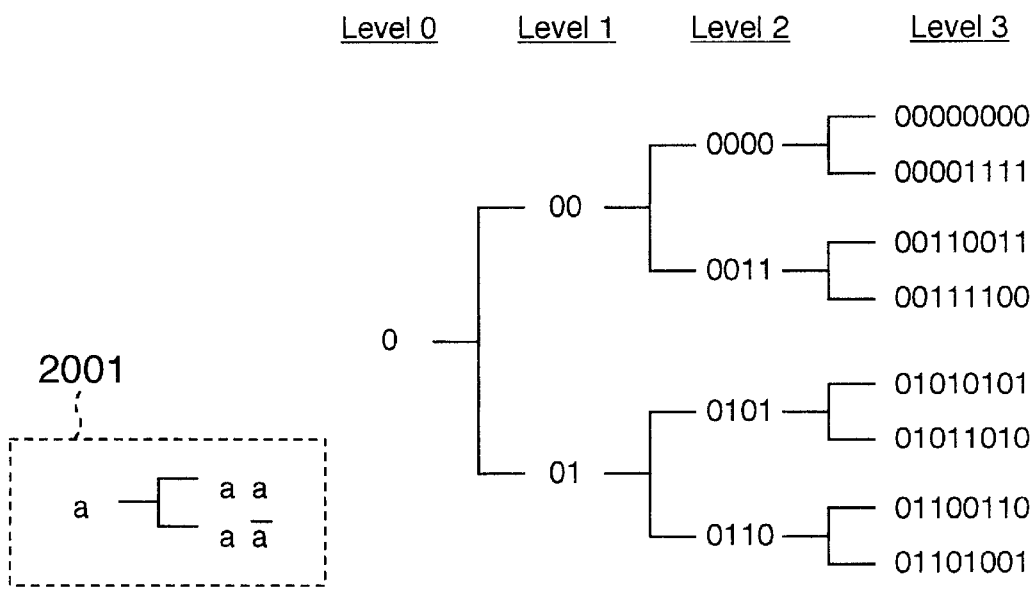
FIG. 20 is a diagram for explaining a layered orthogonal code according to the present invention.

Next, the amount of radio resources used by a radio base station in this embodiment will be described with reference to FIGS. 20 and 21.

First, the concept of the orthogonal code and a method of generating the same will be described with reference to FIG. 20. This embodiment employs a layered orthogonal code. A correlated value in a digital signal is generally defined as "(the number of match bits−the number of unmatch bits)/the total number of bits)". For example, a correlated value for a bit sequence "01101100" and a bit sequence "10110110" is calculated as $(3-5)/8=-¼$ since the third, sixth and eighth bits match and the first, second, fourth, fifth and seventh bits unmatch. "Orthogonal" digital signals mean that their correlated value is zero. For example, a bit sequence "01101100" and a bit sequence "00000101" have four match bits and four unmatch bits, so that they are the to be orthogonal.

The layered orthogonal code refers to an approach for recursively producing $2^n$ orthogonal codes having a length of $2^n$, and codes produced by this approach. First, a 1-bit value is provided as Level 0. In FIG. 20, the value is "0." Subsequently, an operation of producing two bit sequences at Level n+1 from a bit sequence at Level n is recursively repeated to recursively produce orthogonal codes. As indicated at 2001 in FIG. 20, this is realized by producing from a bit sequence a at Level n a bit sequence aa, which is produced by repeating twice the bit sequence a, and a bit sequence aā, which is a combination of the bit sequence a and the inverted bit sequence a.

Next, the concept of the amount of radio resources and the amount of radio resources used in this embodiment will be described with reference to FIG. 21. Generally, the spreading with an orthogonal code in a direct spread CDMA scheme is such that the orthogonal code is outputted as it is if information bit is "0," and an inverted orthogonal code is outputted if information bit is "1." Consider a case (a) in FIG. 21 as an example. This example shows that an information bit sequence "1010" is spread with an orthogonal code "01." Since the first bit of the information bit sequence is "1," a spreader 201 outputs "10" which is an inversion of the orthogonal code "01." Since the second bit of the information bit sequence is "0," the spreader 2102 outputs the orthogonal code "01" as it is. Subsequently, such operations are repeated to produce an output bit sequence "10 01 10 01." The output bit rate is equal to the input bit rate multiplied by the length of the orthogonal code. Upon reception, the original information bit sequence "1010" can be restored by dividing the output bit sequence by the length of the orthogonal code, and sequentially computing the correlation of each of divided bits with the orthogonal code "01" to determine that a corresponding bit in the original information bit sequence is "1" if the correlated value is –1, and "0" if the correlated value is 1.

It should be noted herein that a bit sequence spread by an orthogonal code is orthogonal not only to bit sequences spread with other orthogonal codes at the same Level, but also to bit sequences spread with all other orthogonal codes other than those orthogonal codes which fall under ancestors or descendants in an orthogonal code generating tree. For example, when calculating the correlation of a bit sequence "10011001" spread with an orthogonal code "01" with an orthogonal code "00" and orthogonal codes "0000," "0011," "0000000," . . . produced from the orthogonal code "00," resulting correlated values are all zero.

Stated another way, if orthogonal code spreaders have the same output bit rate, information at different input bit rates can be transmitted using orthogonal codes of different bit lengths. For example, the communication rate can be doubled by using an orthogonal code having a length equal to one half the currently used orthogonal code.

As mentioned above, the number of orthogonal codes has a limitation. There are n orthogonal codes having a length n. Also, when a certain orthogonal code a is used, an orthogonal code which is its descendent cannot be used because they are not orthogonal. From a general consideration on the foregoing situations, it is contemplated that the amount of radio resources per radio base station is limited, and that the use of orthogonal codes having a length n is comparable to the use of 1/n of the amount of radio resources available to each radio base station.

Figure 21:
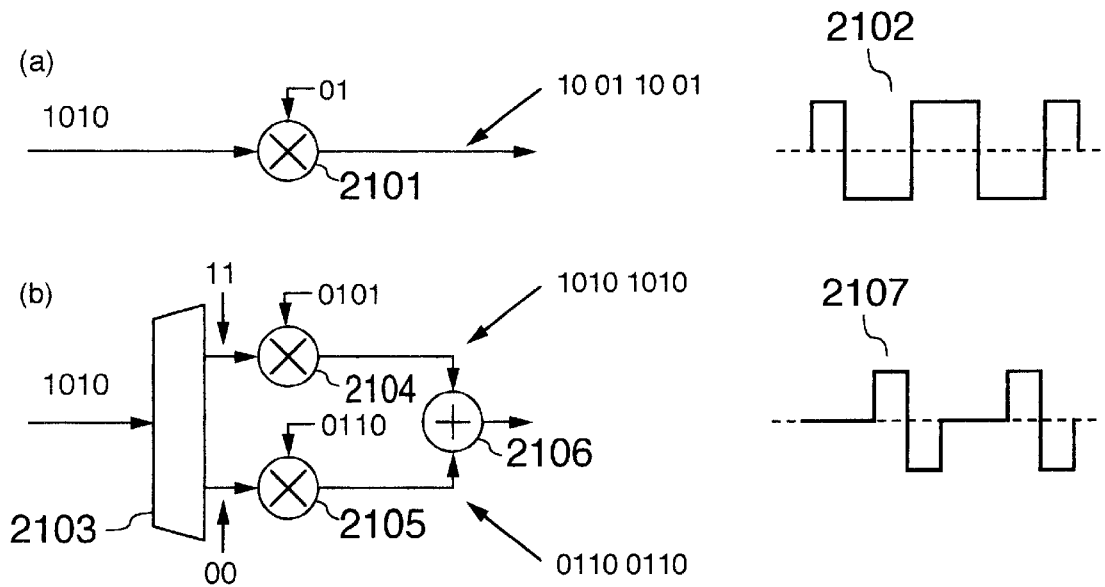
FIG. 21 shows an embodiment of spreading using the orthogonal code of the present invention.

Next, FIG. 21(*a*) and FIG. 21(*b*) are used to demonstrate that the amount of radio resources used by the method of the present invention when no handoff is made is equal to the conventional method. FIG. 21(*a*) shows an exemplary process implemented by the conventional method. In this example, since a 2-bit orthogonal code "01" is used, one half of the amount of radio resources is used. An output signal is represented by a waveform 2102.

FIG. 21(*b*) shows an exemplary process implemented by this embodiment. First, an input bit sequence "1010" is divided into two bit sequences "11" and "00" by a multiplexer 2103. It should be noted here that the output bit rate is one half the input bit rate. Thus, spreaders 2104, 2105 use 4-bit orthogonal codes 0101, 0110. The outputs of the spreaders 2104, 2105 are arithmetically added by an adder 2106, interpreting "0" as "–1" and "1" as "1." The output of the adder 2106 is represented by a waveform 2107. The amount of used radio resources is calculated as $2 \times \frac{1}{4} = \frac{1}{2}$, because two orthogonal codes having a bit length of four are used.

Although the signals 2102, 2107 have different waveforms, they are signals orthogonal to an orthogonal code "00," having the same bit rate and transmitting the same information. The amounts of used radio resources are also the same. In this embodiment, the number of partial channels has been chosen to be two. If the number of channels is increased to $2^n$, the amount of used radio resources remains unchanged by using orthogonal codes having a length of $2^n$. The foregoing discussion has demonstrated that the amount of radio resources used by this embodiment when no handoff is made is equal to the conventional method.

Further, in this embodiment, the amount of radio resources used when a handoff is made is equal to the amount of radio resources used when no handoff is made, in a viewpoint of the entire system. This is because the base station controller controls such that each of partial channels is transmitted only from any of radio base stations.

As described above, the present invention can realize a handoff without changing the amount of used radio resources available to a radio base station when a channel is switched, and without suffering from disruption. This can result in saving radio resources and transmission power of the radio base station as well as increasing the capacity of subscribers for the entire system, as compared with a conventional soft handoff. This effect is significant particularly when the present invention is applied to high speed data communications which use a large amount of radio resources and a high transmission power.

In addition, the present invention can be readily applied to a conventional CDMA radio communication system.

What is claimed is:

1. A handoff method for a radio communication system comprising a mobile station, a plurality of radio base stations, and a controller for controlling a handoff of said mobile station between said radio base stations, wherein said controller transmits a first partial channel transmission start instruction signal for transmitting a first partial channel to a handoff destined radio base station within said plurality of radio base stations, and said handoff destined radio base station transmits the first partial channel based on said first partial channel transmission start instruction signal;

when said mobile station has connected said first partial channel to said handoff destined radio base station, said controller transmits a first partial channel transmission stop instruction signal for stopping the transmission of said first partial channel to a handoff initiated radio base station;

said handoff initiated radio base station, upon receipt of said first partial channel transmission stop instruction signal, stops transmitting said first partial channel;

said controller, upon starting/completing a handoff of said first partial channel, transmits a second partial channel transmission start instruction signal to said handoff destined radio base station within said plurality of radio base stations, and said handoff destined radio base station transmits said second partial channel based on said second partial channel transmission start instruction signal;

when said mobile station has connected said second partial channel to said handoff destined radio base station, said controller transmits a second partial channel transmission stop instruction signal for stop transmitting said second partial channel, which has been connected, to said handoff initiated radio base station; and said handoff initiated radio base station, upon receipt of said second partial channel transmission stop instruction signal, stops transmitting said second partial channel.

2. A handoff method for a radio communication system comprising a mobile station, a plurality of radio base stations, and a controller for controlling a handoff of said mobile station between said radio base stations, wherein said controller transmits a first partial channel transmission start instruction signal for transmitting a first partial channel to a handoff destined radio base station within said plurality of radio base stations, and said handoff destined radio base station, based on said first partial channel transmission start instruction signal, encodes transmission information directed to said mobile station, divides said encoded transmission information into a plurality of partial channels, orthogonally encodes said plurality of partial channels respectively with orthogonal codes which are orthogonal to each other, spreads said orthogonally encoded partial channels with a spread code, and transmits a first partial channel within the spread partial channels;

when said mobile station has connected said first partial channel to said handoff destined radio base station, said controller transmits a first partial channel transmission stop instruction signal for stopping the transmission of said first partial channel, which has been connected, to a handoff initiated radio base station;

said handoff initiated radio base station, upon receipt of said first partial channel transmission stop instruction signal, stops transmitting said first partial channel;

said controller transmits a second partial channel transmission start instruction signal to said handoff destined radio base station within said plurality of radio base stations, said handoff destined radio base station, based on said second partial channel transmission start instruction signal, encodes transmission information directed to said mobile station, divides said encoded transmission information into a plurality of partial channels, orthogonally encodes said plurality of partial channels respectively with orthogonal codes, which are orthogonal to each other, spreads the orthogonally encoded partial channels with a spread code, and transmits a second partial channel within the spread partial channels;

when said mobile station has connected said second partial channel to said handoff destined radio base station, said controller transmits a second partial channel transmission stop instruction signal for stop transmitting said second partial channel, which has been connected, to said handoff initiated radio base station; and said handoff initiated radio base station, upon receipt of said transmission stop instruction signal, stops transmitting said second partial channel.

* * * * *